(12) United States Patent
Remer et al.

(10) Patent No.: US 10,654,732 B2
(45) Date of Patent: May 19, 2020

(54) EQUIPMENT AND PROCESS FOR MASSIVE DISSOLUTION OF GASES IN LIQUIDS

(71) Applicant: Biotecam Assessoria e Desenvolvimento de Tecnologia Ambiental Ltda., Rio de Janeiro (BR)

(72) Inventors: Ricardo Amaral Remer, Rio de Janeiro (BR); Wim Mautits Sylvain Degrave, Rio de Janeiro (BR)

(73) Assignee: Biotecam Assessoria e Desenvolvimento de Tecnologia Ambiental Ltda., Rio de Janeiro (BR)

( * ) Notice: Subject to any disclaimer, the term of this patent is extended or adjusted under 35 U.S.C. 154(b) by 208 days.

(21) Appl. No.: 15/570,224

(22) PCT Filed: Apr. 28, 2016

(86) PCT No.: PCT/BR2016/050092
§ 371 (c)(1),
(2) Date: Oct. 27, 2017

(87) PCT Pub. No.: WO2016/172777
PCT Pub. Date: Nov. 3, 2016

(65) Prior Publication Data
US 2018/0134593 A1 May 17, 2018

(30) Foreign Application Priority Data

Apr. 29, 2015 (BR) .............................. 102015009753
Feb. 22, 2016 (BR) .............................. 102016003779

(51) Int. Cl.
*C02F 1/74* (2006.01)
*B01F 15/00* (2006.01)
(Continued)

(52) U.S. Cl.
CPC ............ *C02F 1/74* (2013.01); *B01F 3/04262* (2013.01); *B01F 3/04517* (2013.01);
(Continued)

(58) Field of Classification Search
CPC .......... B01F 3/04262; B01F 2215/0052; B01F 3/04517; B01F 3/04524; B01F 5/0643;
(Continued)

(56) References Cited

U.S. PATENT DOCUMENTS 3,790,141 A * 2/1974 Champeau .......... B01F 3/04517
261/77
3,933,654 A * 1/1976 Middelbeek ....... B01D 17/0211
210/521

(Continued)

FOREIGN PATENT DOCUMENTS

EP 2143483 A1 1/2010
EP 2558189 A1 2/2013
(Continued)

OTHER PUBLICATIONS

WIPO, International Search Report (on priority application), dated Jul. 20, 2016.

*Primary Examiner* — Charles S Bushey
(74) *Attorney, Agent, or Firm* — Laurence P. Colton; Smith Tempel Blaha LLC

(57) ABSTRACT

Equipment for massive dissolution of gases in liquids via the formation of thin liquid films and the exchange of gases with said films. The equipment provides movement of liquids over great distances via the upward movement of bubbles therein. The equipment can alter the direction of the flow of water, said aspect being useful for the recovery of liquid bodies. In addition to providing a high rate of dissolution of gases in liquids, the equipment is very energy-efficient and has a very large volumetric capacity, thereby being useful (Continued)

for the preservation and/or recovery of liquid bodies, being able, in certain applications, to operate in an energy-autonomous manner. The equipment can be used in situations where energy-efficient dissolution of gases in liquids is desired, such as the preservation and/or recovery of liquid bodies; processes for preserving and/or improving the productivity of aquaculture systems; wastewater treatment systems; and the fixation of gases.

4 Claims, 22 Drawing Sheets

(51) Int. Cl.
*B01F 5/06* (2006.01)
*B01F 13/10* (2006.01)
*B01F 13/00* (2006.01)
*B01F 3/04* (2006.01)
*C02F 7/00* (2006.01)
*C02F 1/20* (2006.01)
*C02F 3/20* (2006.01)
*C02F 103/00* (2006.01)

(52) U.S. Cl.
CPC ........ *B01F 3/04524* (2013.01); *B01F 5/0643* (2013.01); *B01F 13/0049* (2013.01); *B01F 13/1016* (2013.01); *B01F 15/00558* (2013.01); *B01F 15/00571* (2013.01); *C02F 7/00* (2013.01); *B01F 2215/0052* (2013.01); *C02F 1/20* (2013.01); *C02F 3/20* (2013.01); *C02F 2103/007* (2013.01); *Y02W 10/15* (2015.05); *Y02W 10/33* (2015.05); *Y02W 10/37* (2015.05)

(58) Field of Classification Search
CPC ............. B01F 13/0049; B01F 13/1016; B01F 15/00558; B01F 15/00571; C02F 1/20; C02F 1/74; C02F 3/20; C02F 7/00; C02F 2103/007; Y02W 10/15; Y02W 10/33; Y02W 10/37

USPC ....................... 261/108, 112.1, 123
See application file for complete search history.

(56) References Cited

U.S. PATENT DOCUMENTS

| | | | | | |
|---|---|---|---|---|---|
| 4,231,863 | A | * | 11/1980 | Sutphin | ............... B01F 3/04517 210/151 |
| 4,486,361 | A | * | 12/1984 | Durot | .................. B01F 3/04106 209/170 |
| 4,859,321 | A | * | 8/1989 | Iida | ..................... B01F 3/04765 210/150 |
| 5,091,315 | A | * | 2/1992 | McCarty | ................... C02F 3/28 210/320 |
| 5,223,130 | A | * | 6/1993 | Valfrido | ................. A01K 63/04 210/170.02 |
| 5,262,051 | A | * | 11/1993 | Iwatsuka | ................... C02F 3/06 210/150 |
| 6,676,837 | B2 | | 1/2004 | Keeton | |
| 6,773,592 | B2 | | 8/2004 | Bellamy | |
| 7,494,534 | B2 | | 2/2009 | Fukagawa | |
| 8,178,330 | B2 | * | 5/2012 | Trevethick | ............. C12M 21/12 435/161 |
| 8,292,271 | B2 | | 10/2012 | Fujisato | |
| 8,366,938 | B2 | | 2/2013 | Capeau | |
| 2005/0279713 | A1 | | 12/2005 | Osborn | |
| 2008/0018534 | A1 | | 1/2008 | Wu | |
| 2008/0185344 | A1 | * | 8/2008 | Fujisato | ............... A01K 63/042 210/703 |
| 2010/0044322 | A1 | | 2/2010 | Tetsuhiko | |

FOREIGN PATENT DOCUMENTS

| | | |
|---|---|---|
| GB | 2245556 A | 1/1992 |
| JP | 2003334594 A | 11/2003 |
| SI | 24084 A | 11/2013 |
| WO | 2001097958 A1 | 1/2004 |
| WO | 2007125996 A1 | 9/2009 |

* cited by examiner

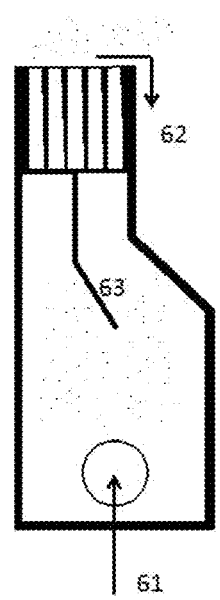
FIG. 6
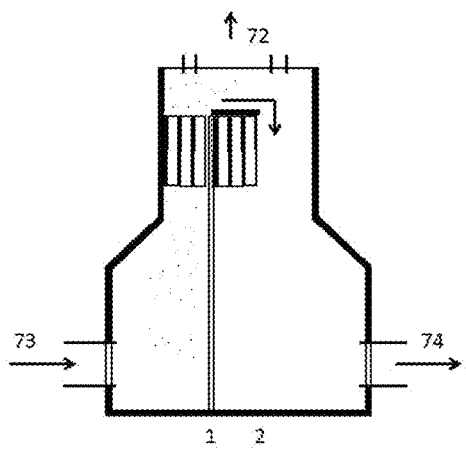 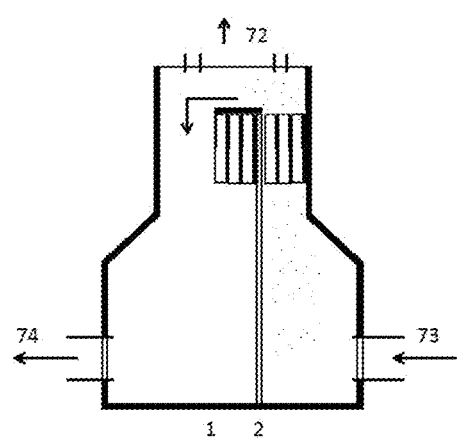
FIG. 7A          FIG. 7B

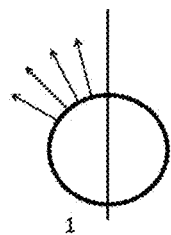
FIG. 8A
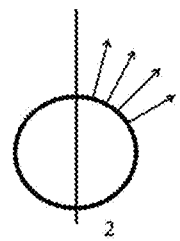
FIG. 8B
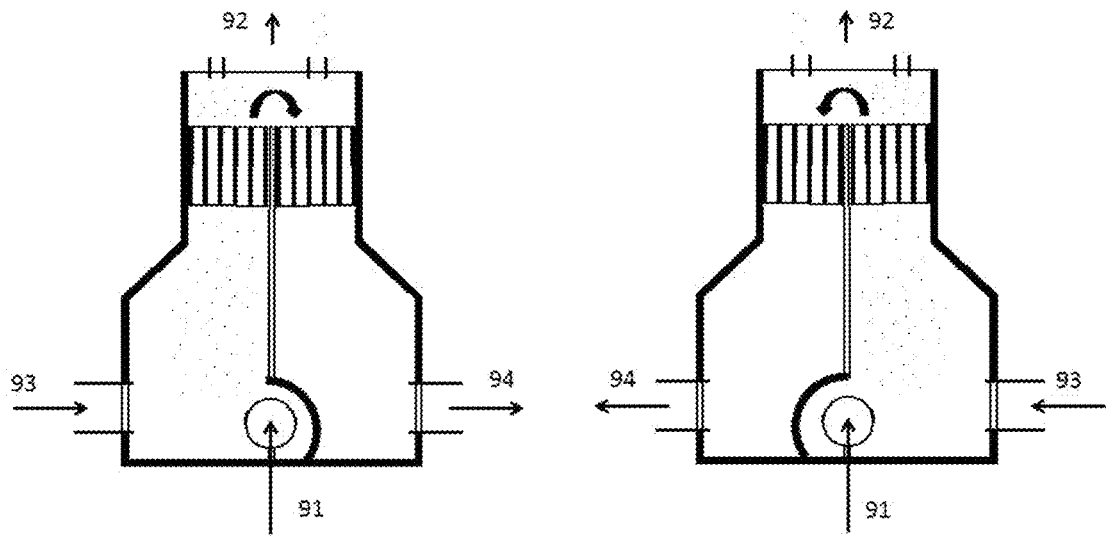
FIG. 9A
FIG. 9B

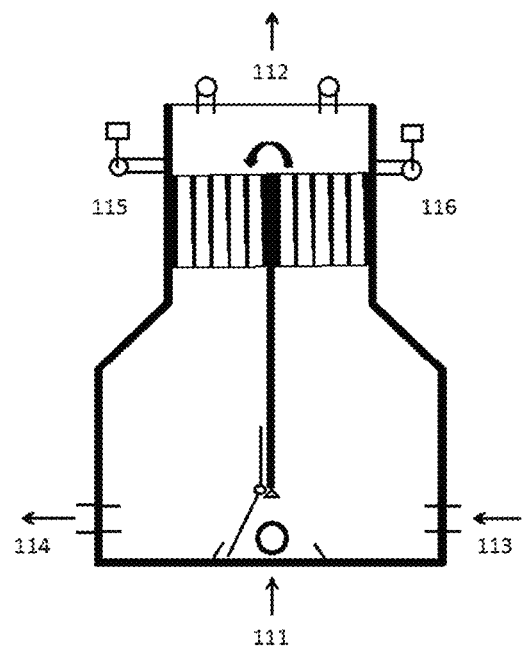
FIG. 11
 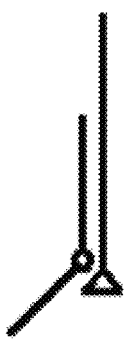 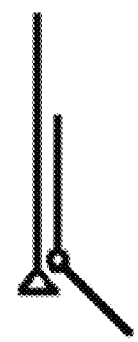
FIG. 12A    FIG. 12B    FIG. 12C

EQUIPMENT AND PROCESS FOR MASSIVE DISSOLUTION OF GASES IN LIQUIDS

BACKGROUND OF THE INVENTION

Technical Field

The present invention belongs to the fields of Chemical and Environmental Engineering and refers to an equipment and process for the massive dissolution of gases in liquids in an energy-efficient manner and/or with utilization of energy from alternative sources, particularly useful for the preservation and/or recovery of liquid bodies. The equipment of the invention is also referred to as the "Lung" because it is highly efficient in the dissolution of air into liquids, analogously to what our organ does in the blood.

The invention is applicable to various situations in which controlled and adjustable dissolution of gases into liquids in large quantities, high dissolution rate and energy efficiency is desirable, and can operate with energy autonomy or with reduced need for external power supply, i.e. energy and/or fuels distribution networks. Examples include, but are not limited to, the conservation and/or recovery of water resources, such as ponds, rivers, bays, mangroves and beaches, the removal of undesirable organic loads, the revitalization of liquid bodies and/or capability of bathing thereof, as well as processes conservation and/or improvement of conditions of quality, productivity and/or environmental efficiency of aquaculture processes, such as the cultivation of fish, shrimp, algae and other organisms in liquid culture.

Prior Art

The dissolution of gases into liquids is a particularly relevant technical problem in the case of sparsely soluble gases, which limits the amount of dissolved gases, their rate of dissolution and/or involves high energy demand and cost to be performed. The oxygenation of large liquid bodies, for example, is a technical challenge not yet overcome—as evidenced by the fish mortality events in Lagoa Rodrigo de Freitas (RJ), as well as the state of the lagoon complex of the Baixada de Jacarepaguá (RJ) and the lagoon complex of Osório (RS), among several other cases in Brazil or other countries. In this context, the severe water crisis that plagues several countries and more recently Brazil has drawn attention to the issue of water resources management and the need for new technologies to overcome the existing bottlenecks.

Of particular importance in the context of the present invention are the "liquid bodies", i.e., rivers, ponds, dams, lagoons, bays, beaches and mangroves. The disorderly growth of cities and especially the lack of adequate management of water and/or effluents resources have generated increasing pressure on such liquid bodies, either by the excessive use of water or by the discharge of organic loads in them, or both, causing substantial increased concentration of undesirable substances and high oxygen demand (BOD, COD, biochemical oxygen demand and chemical oxygen demand, respectively).

Aquaculture processes initiatives for the captive food production have also been significantly increased, notably in farming tanks of fish, shrimp, algae, etc. This industry has also faced technical difficulties regarding productivity and/or product quality, use, reuse or waste water.

In both cases cited above, the low oxygen concentration dissolved in water is a frequent technical problem and still not satisfactorily solved. Although various devices and processes for the dissolution of gases in liquids, such as forced aeration and their use in the preservation or recovery of liquid bodies, are available, such systems are unfortunately limited by low volumetric capacity, low efficiency of gases introduction in the bodies liquid, high energy consumption.

The introduction of air into liquid bodies has been used for many years as a way to improve the performance of biological treatment systems for the removal of organic load, being predominantly applied to liquid effluents, i.e. in environments contained in the treatment stations. Similar approach has been adopted to improve the quality and/or productivity of systems and aquaculture such as fish, shrimp, algae and other organisms that can be grown in tanks or other liquid bodies. Certain species of fish only develop fully in very cold water environments, probably because of the high amount of dissolved oxygen in such circumstances. In both cases, however, the technologies available have substantial limitations. In addition, open liquid bodies, such as rivers, ponds, bays and beaches are generally not propitious environments to the approach of forced introduction of air/oxygen, due to the limitations of current technologies. The present invention provides a solution to these problems.

A significant difficulty in the state of the art for liquid body aeration systems (in both aerobic and aquaculture bioremediation systems) lies in the fact that the vast majority of such systems require a lot of energy for the dissolution of air in the body liquid and are in addition inefficient to significantly and effectively increase the rate and amount of oxygen dissolution in the liquid body. In this context, it is known that the solubility of oxygen in water is low, which is aggravated at elevated temperatures such as those typical of tropical regions. Thus, the introduction and effective dissolution of air/oxygen into large liquid bodies under open or tropical conditions has been a major technical challenge, since under such conditions the amount of dissolved oxygen in the liquid body is predominantly low, being particularly critical when temperature is high and/or the organic load is high. The present invention also provides a solution to these problems.

There are different approaches to the forced dissolution of gases in liquids on the market and in the state of the art. However, the equipment of the technique has limitations, since none of them has, concurrently, a high rate of dissolution of gases, low energy consumption and high volumetric capacity. Devices and equipment with high gas dissolution rate and high energy efficiency are known, but with low volumetric capacity. Also known are equipments with high volumetric capacity, but with low rate of dissolution of gases. Accordingly, there is in the art a demand for equipments and processes which not only provide for increasing the amount or rate of dissolution of gases in the liquid body, but which have a high volumetric capability, low energy consumption and high gas dissolution rate. The present invention also provides a solution to these problems.

Equipments currently available for the introduction of gases into liquids presents further several technical difficulties, including, but not limited to: (i) are poorly energy efficient; (ii) have limited ability to effectively dissolve gases in liquids, both from the point of view of velocity and the total amount of dissolved gases; (iii) introduction of air/oxygen into large liquid bodies requires a large amount of energy from an external source, which makes it practically and/or economically unfeasible; (iv) it is very difficult to control environmental conditions in large liquid bodies, with fluid dynamics being an additional factor that can greatly modify the profile and concentration of substances present in the liquid body; (v) normally have no ability to adjust the amount of dissolved gases and/or the direction of liquid flow according to the interest; (vi) equipments that provides all these advantages are not yet available. These and other technical difficulties are overcome by the present invention.

Due to the limitations of known equipments and processes, the approaches for the conservation and/or recovery of degraded liquid bodies are very limited and generally require a high time for effective recovery—this is if and when the rate of degradation of the organic loads present in the liquid body due to forced aeration is greater than the rate of entry of new organic loads, which is often not the case. Accordingly, there is in the art a demand for equipments and processes which not only provide for increasing the amount and rate of gas dissolution in the liquid body for the removal of organic loads, but especially that they are adjustable under different conditions, either to respond to climatic conditions, variations in arrival of organic loads or other factors. This technical demand/difficulty occurs in several types of liquid systems, whether in the treatment of effluents or in the recovery of degraded liquid bodies, or in aquaculture—where, in addition, the type and quantity of fish, shrimp or other cultured organisms also exert an influence on concentration of dissolved oxygen in the water and/or the organic load to be removed or converted. Similarly, the occurrence of rainfall, tides and other environmental conditions also impacts tanks of fish farming as well as ponds, rivers, bays and other open areas. The present invention also provides a solution to these problems.

In the preservation and/or recovery of liquid bodies it is also known the approach to introduce large quantities of microorganisms capable of degrading the organic loads produced or deposited in the liquid body. This type of approach aims to improve the performance of the organic load removal, providing greater efficiency of the process as a whole and reducing the energy consumption and/or the time required for the recovery. However, the introduction of microorganisms that are/were not previously present in the liquid body can give rise to complex environmental and regulatory concerns. Thus, the options for using the abilities or "capacities" of exogenous or exotic microorganisms to degrade undesirable substances in such circumstances are very limited. In addition, the acquisition of microorganisms previously cultured and added in the form of powder containing large amounts of lyophilized spores or microorganisms is not suitable for the enrichment of specific microbial flora in closed or open liquid bodies due to several technical limitations: the cost and availability of the microorganisms, which are generally imported and suffer from exchange variation; the logistical difficulties of transport and inventory; the environmental risks and/or human health, because it is the transport of microbial material in large quantities; and in particular the limitation of the amount available for introduction into the liquid bodies and the low state of metabolic activation of the organisms when introduced under these conditions. In addition, a critical problem that often makes it impossible to treat watercourses, such as lakes, ponds, rivers, canals, river or sea arms, bays, etc., is the prohibition of the introduction of exogenous microorganisms into such watercourses, for its possible and/or unknown environmental impact. The present invention also provides a solution to these problems by disclosing an equipment and process that provides for massive dissolution of gases in said liquid bodies contaminated with organic loads or effluents of different origins, situation in which the equipment and process of the present invention optionally also comprises a device or subsystem for the ex-situ and selective enrichment of organisms previously existing in the liquid bodies and their on-site reintroduction.

The intensive dissolution of gases into liquids provided by the equipment and process of the invention is also suitable for the dissolution and fixation of $CO_2$ generated in industrial plants. The equipment of the invention is also useful for the dissolution of such gases into liquids, an embodiment in which the carbon dioxide-containing gases (or parts thereof) from facilities are dissolved in water in an algae culture tank. This approach reduces the environmental impact of carbon dioxide-emitting facilities. Algae use $CO_2$ for their growth and/or production of substances of economic interest, in addition to producing oxygen. In this context, it is important to note that at room temperature $CO_2$ is 26 times more soluble in water than $O_2$.

In at least one such circumstance, the currently available approaches for the introduction of gases into liquids present a number of technical difficulties, including, but not limited to: (i) they are poorly energy efficient; (ii) they have limited ability to effectively dissolve gases in liquids, both from the point of view of velocity and the total amount of dissolved gases; (iii) the introduction of air/oxygen into such liquid bodies, especially in high dimensions, usually requires a large amount of energy from an external source, which makes it practically and/or economically unfeasible; (iv) it is very difficult to control environmental conditions in large liquid bodies, with fluid dynamics being an additional factor that can greatly modify the profile and concentration of substances present in the liquid body; (v) known systems usually have no ability to adjust the amount of dissolved gases according to ambient conditions or energy availability; (vi) known systems normally do not have the ability to displace large amounts of liquid at different depths without significant energy consumption; and (vii) in the case of technologies that use microorganisms, it is worth noting the restriction on the use of exotic micro-organisms in the ecological system in question, which limits their applicability; moreover such approaches are hardly adjustable in terms of the amount of microorganisms added and/or their state of metabolic activation. These and other technical difficulties are overcome by the present invention.

The searches in the patent literature have pointed to some partially relevant documents in the context of the present invention, which will be described below.

U.S. Pat. No. 7,494,534, titled "Method, device, and system for controlling dissolved amount of gas" discloses a device a device for controlling the amount of gas dissolved in a liquid. Said device comprises: a pressure reducing portion capable of reducing the pressure within a tank by connecting an aperture in the top of the enclosed tank with a vacuum pump through a tubing; an element for injecting treated and pressurized fluid into the top of the tank with a nozzle capable of covering a large part of the area under reduced pressure; a liquid foam generating part which receives the treated fluid in a container in the center of the opening thereof and generating a large quantity of bubbles in the bottom part thereof. This arrangement converts air bubbles into liquid bubbles. The device further comprises a recovery pump portion which allows the liquid bubbles to overflow from the top of the container and pour to a lower part, temporarily storing the liquid bubbles as deaired treated fluid, finally collecting the treated fluid.

WO 2007/125996, titled "Water quality improving unit and water quality improving device", discloses a unit of water quality improvement. Said unit includes a device that increases the transparency of the water by removing the organic load, which floats on the surface of the water along with micro bubbles, and can improve water quality through the balance of dissolved gases such as oxygen and nitrogen. Said unit comprises a body having a hollow portion, formed almost rotationally symmetrically and with reduced diameter towards both axial directions. The periphery in the tangential direction of the unit comprises an opening for introducing liquid. Vertically directed gas-liquid jets openings are arranged to open in a vertical direction along the axial direction of the axis of rotational symmetry of the hollow part. There are also provided in the reduced diameter portions of the hollow part a carrier tube of a structure connected with the opening which directs the gas-liquid jet upwards, having a recess or space there between. It also comprises a liquid bubble generating container connected to the upper body so as to form a liquid bubble aggregate from the upward flow of the mixture.

WO 2001/097958, titled "Fine air bubble generator and fine air bubble generating device with the generator", discloses a small air bubble generator capable of preventing the formation of aggregates of reagents and waste. Said device provides the production of large amounts of small air bubbles in the water and comprises: a generator body (1a) having a hollow part in rotational symmetry; an opening for the inlet of liquid air in the tangential direction; and openings for the liquid air insufflations in the direction of the symmetry axis of the hollow part.

U.S. Pat. No. 8,292,271, titled "Aeration unit, aeration apparatus equipped therewith and method of aeration" discloses an equipment and an aeration method. The said equipment is of multiple stages, constituted of: a diffuser to produce bubbles in the water; a liquid foam generating channel for converting air bubbles into liquid bubbles; a gas retention chamber with space for holding the gas in the water and a portion for accumulating newly formed bubbles under the gas retention chamber.

US 2008/018534, titled "Aeration method, aeration apparatus and aeration system", discloses a method and apparatus for aeration useful for improving the conditions of sewage treatment systems, the cultivation of fish and other aquatic organisms, among others. The apparatus provides highly efficient water gas dissolution and comprises: a gas spray section (22) for generating particles of gas bubbles in the water to be treated (1W), a bubble rise section (3P) for providing the upward movement of the generated bubbles, in which the gas bubbles are drawn to a position above the surface of the water, becoming liquid bubbles or thin films; and a transfer section (5P) in which the treated water (2W) can be transferred.

EP 2558189, titled "A micro bubble generator", discloses a micro bubble generator comprising: a pump configured to mix a liquid in a gas, forming a pressurized gas-liquid mixture; a contact chamber in hydraulic connection with the pump and configured to increase dissolution of gas in said pressurized gas-liquid mixture; and a valve in hydraulic connection with the contact chamber. The arrangement is configured to discharge an emulsion of micro bubbles comprising the liquid and the gas micro bubbles.

U.S. Pat. No. 8,366,938, titled "Method and device for purifying liquid effluents", was issued on Feb. 5, 2013. Said document discloses a method in which water is separated from other substances by air bubbling in a vertical apparatus (3), in effluents fed at a flow rate "D". The apparatus has a free surface and includes at least two compartments (4, 5, 6, 7) communicating with each other to provide successive top-down and bottom-up circulation between the lower portion of the apparatus and a level medium, at an airflow rate at least three times greater than the effluent flow rate. The supernatant phase is continuously discharged and the chemical oxidation of the liquids or gases from said effluent is simultaneously conducted in the same apparatus. The chemical oxidation rate and bubble flow (and size) rate are selected so as to progressively separate the solid/liquid and liquid/liquid phases on the surface of the apparatus to obtain a chemical oxygen demand (COD) below a predetermined limit.

US 2005/0279713, titled "System and method for dissolving gases in liquids", was issued on Dec. 22, 2005. Said document discloses an equipment and method for dissolving gas in a liquid and comprises a saturation tank and a pressurized gas source connected to a head space of the saturation tank. The saturation tank contemplates a pressurized tank containing at least one injector nozzle which allows the passage of liquid within the pressurized tank and an outlet for the liquid containing dissolved gas. Upon passage of liquid containing gas into a second fluid, the gas is released in the form of micro bubbles. The micro bubbles assist in the flocculation of suspended particles and promote the dissolution of the gas in the second fluid. The preferred gas is air, oxygen or ozone, being those applicable to the use in the treatment of rivers, ponds and industrial facilities.

U.S. Pat. No. 6,676,837, titled "Solar aeration system", was issued on Jan. 13, 2004. Said document discloses a solar powered aeration system comprising a battery. The device described in said document is applicable to aquaculture systems and does not require the use of an external power source. The device uses a laminar column of water to increase the water circulation in the water reservoir to be aerated.

U.S. Pat. No. 6,773,592, titled "Systems and methods for treating waste water using an inoculum", was issued on Aug. 10, 2004. Said document discloses a method for treating effluents/sewage and involves treating the collection system before the effluent reaches the treatment unit. A key aspect of said method is the introduction of an inoculum of selected microorganisms into a quiescent zone of the collection network. The quiescent zone is where the effluent is significantly decelerated in the collection network and may be temporarily stationary, i.e. a pumping station or low area in two sections of a duct. Microorganisms tend to multiply in these quiescent zones. The introduction of competitive culture inoculum to undesirable microorganisms (which impair effluent degradation) improves the efficiency of the entire treatment system. Said method is similar to the known art state approach of addition of cultured off-site microorganisms.

SI 24084 A, from a Slovenian inventor, reveals a bubble-generating turbine driven by an electric motor. Said turbine, known as Toring Turbine, provides large-scale liquids aeration by the effect of water ejection from the turbine blades and the consequent suction generated inside the turbine. The turbine is hollow and connected to a hollow shaft fitted with holes in the region above the water level where it connects with the electric motor. Thus, the rotation generated by the motor provides the formation of external air suction inside the hollow axis, being the air flow subjected to the shear force of the turbine blades, generating micro bubbles. Said equipment has a high volumetric capacity for introducing gas into the liquid, but does not provide a high gas dissolution rate in the liquid, since it forms a mixture of macro bubbles and micro bubbles. In addition, the area of influence of the turbine is restricted to a diameter around it, that is, several of these devices are required in lakes or large areas of water, in addition to requiring flotation devices and power grids to locations far from the banks.

EP 2143483 B1, which is equivalent to U.S. Pat. No. 8,292,271, titled "Aeration unit, aeration apparatus equipped therewith" discloses an aeration apparatus based on the principle of fine liquid film formation. Said apparatus/device is considered to be the closest to the equipment of the present invention, being comprised of: an air diffuser for producing conventional air bubbles in water within a cylindrical tube containing a fine liquid-film generating channel to convert air bubbles in liquid bubbles. What characterizes said device is the fact that above the fine films (or liquid foam) generating channel there is a gas retention chamber with space for holding the gas in the water and a portion for accumulating newly formed bubbles under gas retention chamber. Said equipment has severe limitations of volumetric capacity of gas dissolution in massive volumes of liquids. Moreover, due to its limited individual volume capacity, said device causes difficulties in use and assembly, since when it is desired to aerate large volumes of liquid large amounts of devices are required. The commercially available device according to said patent has a diameter of 4 cm in the liquid thin film forming region and maximum full aeration capacity (i.e. saturation with oxygen) of only 20 liters of water per minute. The equipment of the present invention, in contrast, provides a much larger gas dissolution scale, orders of magnitude higher than said device of the art. Examples shown in FIGS. 4, 13 and 17 respectively provide complete aeration (i.e., saturation with oxygen) of 1200, 2400 and 9600 liters of water per minute. In addition, the equipment of the invention also provides other structural and operational advantages, as will be more fully described below.

In conclusion, equipments for the introduction of gases into liquids are known in the art and the principles of operation are basically as follows: (i) introduction of regular size gas bubbles and use of mechanical force to facilitate their dissolution. This technique is poorly energy efficient and provides low rate of gas dissolution; (ii) introduction of micro bubbles, which due to their better volume area ratio increase the rate of dissolution of gases in the liquid. In general, these equipments make use of the generation of high velocity liquid flows, generating a vacuum that provides the introduction of gas in the form of micro bubbles, as is the case of Venturi and other devices that operate on the basis of pressurized water, or in turbines as exemplified in SI 24084 A. This technique, in any of the circumstances cited above, requires high energy for the movement of liquids with high velocity and thereby to provide micro bubble generation; (iii) devices that provide aeration through thin films liquid, such as disclosed in EP 2143483. However, this device suffers from low volumetric capacity and is not applicable in practice to situations of high volume of liquid to be aerated due to the complexity of assembly and use and the cost.

The equipment of the present invention differs from those described in said documents, among others, for a number of technical reasons. On the one hand, the equipment of the invention provides a substantial increase in the amount and rate of dissolution of gases in the liquid body, with low energy consumption, low cost, high volumetric capacity for dissolving gases—some magnitude orders higher than the known similar. In addition, the equipment of the invention provides for gas exchange (or stripping) rather than just introducing gases in large quantities. In this aspect, a fundamental technical difference is that in the system of the invention there is no injection of gaseous species in the liquid but rather the exchange of gases, whereas in conventional systems there is gas injection, which can lead to the serious problem of saturation with undesirable gases. In one embodiment, the equipment of the invention further comprises means for altering/controlling the direction of water flow, this being yet another further technical advantage that is not attained by prior art devices/equipment.

The process of the present invention differs from said documents, among other technical reasons, by providing an efficient process for substantially increasing the amount and rate of dissolution of gases in the liquid body, with low energy consumption and ability to adjust to different circumstances of operating conditions, climate and/or energy availability from external sources. The process of the invention conveniently combines the features of the equipment of the invention with the features of other equipment available in the prior art, providing substantial technical advantages.

Based on the patent and non-patent literature, it is clearly noted that there is a need to search for alternative solutions to existing ones to overcome the limitations of equipment and processes for the massive dilution of gases into liquids useful for the conservation and/or recovery of liquid bodies. The present patent application discloses solutions to these problems. From the literature reviewed, no documents were found anticipating or suggesting the teachings of the present invention which, in the view of the inventors, has novelty and inventive step in the face of the prior art.

BRIEF SUMMARY OF THE INVENTION

The inventive concept common to the various protection contexts of the present invention is a "Lung", equipment specifically developed for substantially increasing the amount and rate of dissolution of gases in such liquids. The equipment of the invention is capable of adjusting to different circumstances of operation and high energy efficiency, operating in an energetically autonomous manner or with reduced demand for external power supply. The equipment is particularly useful for the massive dissolution of gases into liquids and is therefore useful for the preservation and/or recovery of liquid bodies, improved efficiency of effluent treatment plants, aquaculture systems, $CO_2$ fixation systems, among others.

The equipment of the invention operates on the basis of the air lift principle in conjunction with the formation of thin liquid films and has the ability to dissolve more than 1000 L of gas per minute in the liquid, there being embodiments with several full dissolution capacity of gas, i.e. up to the desired saturation, of several $m^3/s$ of liquid. The equipment operates submerged in the liquid in which it is desired to dissolve the gas of interest. From the introduction of gas into a submerged zone inside the equipment, conventional gas bubbles formed ascend due to the natural thrust. By "conventional" in the present invention refers to bubbles formed without the need for high load losses associated with the formation of micro bubbles, for example. The ascending bubbles pass through one or more cross-sectional restriction zones, and then pass through a hive with an even smaller cross-sectional area in relation to the previous zones, which promotes densification and/or coalescence of the bubbles. The bubbles then pass through a cross-sectional expansion zone, which promotes the expansion of bubbles, formation of thin liquid films and the explosion of such films. The liquid resulting from the explosion of the bubbles from thin liquid film is saturated with the desired gases introduced and passes through a channel, by gravity, while the remaining gas released follows its ascending path. The rising-released gas can pass through a new cycle equivalent to that previously described, with subsequent recovery of new amount of liquid saturated with the desired gases. In one embodiment, the gas is air and the liquid is water, but the invention is not limited to such substances.

One of the objects of the invention is an equipment for the massive dilution of gases into liquids comprising:
- a rigid body having a greater cross-sectional zone in the lower region and smaller cross-sectional zone in the upper region, said rigid body comprising one or more liquid inlet regions in the lower portion; one or more liquid outlet region at the top and/or bottom; and one or more gas outlet region in the upper part, said rigid body containing, in its interior:
- one or more conventional gas bubble forming device in the lower region;
- one or more thin liquid film forming hives, said hives having a plurality of inner channels having an even smaller cross-sectional area relative to the smaller cross-sectional zone in the upper region, the liquid in which the gas was dissolved being extravagated after passing through said hive.

In one embodiment, the equipment of the invention further comprises a separation wall within said rigid body, vertically dividing the rigid body at least partially into two regions. In one embodiment, the equipment of the invention further comprises means for reversing the flow direction of liquid passing there through, thereby providing the choice of direction of liquid flows in liquid bodies. Said flow inversion means are very simple to operate, facilitating flow control and aeration processes in liquid bodies such as ponds and bays.

In one embodiment, the equipment additionally includes one or more sets of external pipes connected to the inlet and/or outlet of liquid. Due to the principle of operation of the equipment of the invention, the movement of liquids is feasible at great distances, in practice providing the gas dissolution even at depths of several meters. Depending on the arrangement of the liquid pipes connected to the equipment of the invention, technical effects such as flow directing and the formation of liquid plumes containing desirable gases in regions of interest are feasible with little or no external energy consumption.

In one embodiment, the equipment of the invention makes use of the pre-existing flow of liquids (as in the case of river flow or drop-over in any liquid body) as a driving force for the dissolution of gases. In this embodiment, said propelling force is responsible for the movement of the liquid by the injection/suction of the gas or both, in which case the equipment of the invention operates without or reduced external power supply.

In one embodiment, the equipment of the invention further comprises: (i) one or more gas in liquid dissolving device(s) selected from micro bubble generators, nanobubbles, liquid thin films, or combinations thereof; and/or (ii) one or more subsystems to energetically optimize the introduction/dissolution of gas into the liquid.

The subsystems for energetically optimizing the introduction/dissolution of gas into the liquid are selected from: (iia) one or more pump drive control systems, operating in accordance with the availability of energy and/or its cost, or according to climatic, biological or geophysical cycles; (iib) one or more available kinetic or potential energy utilization systems, including gravity, existing gas and/or liquid flows, such as water drop, flows from river or ship engine, booster pumps and/or pneumatic devices; (iic) one or more energy generating subsystems, such as wind, solar, tidal flow, or chemical transformation, among others; or (iid) one or more ex situ micro-organism enrichment subsystems, which provides the energy demand reduction for the dissolution of gases in the liquid in question.

Process of the invention makes use of the equipment of the invention. The equipment and process of the invention provide for: a high increase in the rate of dissolution of gases into liquids and/or the total amount of gases dissolved in liquids; the reduction of energy consumption, or the need for external power supply for the dissolution of gases in a liquid body; the adjustment of the equipment to environmental conditions or circumstantial needs, or both concurrently.

Process of the invention is particularly useful for the revitalization, conservation and/or bathing of open liquid bodies such as ponds, rivers, lagoons and coves, as well as in increasing environmental the productivity, quality and/or efficiency of aquaculture processes. In such cases, the invention is useful for the removal of undesirable organic loads dissolved or dispersed in liquid bodies. Process of the invention is also useful for the dissolution of other gases into liquids, for example $CO_2$ produced in factories which is conveniently dissolved by the equipment and process of the invention for fixing this carbon source and/or its biotransformation and other substances of economic interest. Still other gases or combinations thereof are conveniently largely dissolved in the equipment and/or process of the invention, including Ozone and mixing thereof with air and/or other gases.

These and other objects of the invention will be readily appreciated by those skilled in the art and by companies having interests in the segment and will be described in sufficient detail for their reproduction in the following description.

BRIEF DESCRIPTION OF THE DRAWINGS

In FIG. 2A there is shown an embodiment of equipment (20) for the massive dilution of gases in liquids visualized in "exploded" view, which operates by the principle of air lift; a gas pump (21) injects gas into the inside of the equipment through a perforated tube (22); the bubbles formed in the liquid rise and pass through one or more cross-sectional restriction zones (23, 24), then passing through a hive (25), which is provided with a series of internal channels (26) with an even smaller cross-sectional area relative to the lower areas (23, 24). The passage of the bubbles by said hive facilitates the formation of thin liquid films, at least in part due to the coalescence of the bubbles. The formation of thin liquid films provides both the saturation of the liquid with the incoming gas and the removal of gases that were previously in the liquid (a phenomenon also called stripping). The equipment of the invention is also very useful for desaturating certain gases from the liquid, i.e., removing unwanted gases in the liquid, replacing them with desired gases. In FIG. 2B the same equipment is shown, but in solid version. There are shown: the gas inlet (21), the gas outlet (22), liquid inlets (23) and a schematic representation of the optional separation wall (25). The area of each liquid and gas inlet section (bottom, 1.2 cm$^2$) is larger than the area of each liquids and gases outlet section (top, 1 cm$^2$).

In FIG. 3A is shown equipment in the form of pyramidal trunk with dimensions of 60×44×100 cm, respectively height, width and length. The top is 15 cm wide. This pyramidal trunk configuration provides stability in riverbeds or water courses and also the rise of conventional air bubbles blown into the equipment, its passage through the reduction of cross section and subsequent passage through the hive through which the bubbles coalesce and form thin liquid films. The liquid bubbles in the film rupture after passing through the hive, so that the liquid saturated with new gases flows out through the side duct as indicated. The remaining gases are released through the upper opening. This equipment embodiment of the invention provides full saturation capacity (or aeration) of desirable gases in the liquid of 1200 liters per minute (only one side) or up to 2400 liters of liquid per minute (operating on both sides). In this embodiment, the equipment operates with two blowers, each of CV-51M (SNatural) model, of 0.5 CV and with flow capacity of 1200 liters of air per minute, pressure of 1200 mm of water column, blowing air through a 100 mm pipe drilled on each side of the separation wall, with 1 mm holes. In FIG. 3B there is shown a schematic representation of this embodiment of the invention equipment in exploded view, the water inlet ducts (33) and the drilled duct (31) for blowing gas are shown, as well as, on top, the outlets of gasifying/aerated (34) and the waste gas (32). In FIG. 3C there is shown a perspective view of this embodiment of the equipment of the invention, the top surface being the area where two hives are located (one on each side of the central separation wall) each containing 7 cm depth and width, and 100 cm in length. In this embodiment, each quadrangular opening of the hive has an area of 1 cm$^2$. In FIG. 3D there is shown a side view of this embodiment of the equipment of the invention, which positions are indicated where the two perforated tubes are placed for gas insufflation (below), and bubble rise. The arrows indicate the liquid flows caused by the rise of the bubbles, which pass through the hives and pass through the sides.

In FIG. 5A there is shown below a perforated tubing (51) for the gas insufflation in the lower part and, in the upper part, the details of the hive (53) through which the liquid and the conventional bubbles pass, forming thin liquid films at the end. The perspective view shows only one side, as used in FIG. 4, but the separation wall 52 may have a hive and a perforated tube also on the other side, as illustrated in FIG. 3D. In FIG. 5B details of another separation wall embodiment (52) used in the equipment described in FIGS. 3A through 3D and FIG. 4 are shown, showing in the upper part details of the hive 53 where the liquid and the conventional bubbles pass, forming the thin liquid films and just below the hive several small extensions (54) vertically to provide dimensional separation of the liquid zones and ascending bubbles. Such extensions are distributed along the length of the separation wall, perpendicular thereto. FIG. 5C illustrates a cross-section of the hive 53.

FIG. 6 shows details of another embodiment of the equipment of the invention (only half of the equipment being depicted), provided with an additional partition (63) to provide dimensional separation of the liquid zones and rising bubbles. Said additional partition is unique and disposed along the extent of the separation wall, parallel thereto in one dimension and angled in another, to proportionally divide the upward flow area of liquid and bubbles. This configuration is conveniently used in conjunction with the embodiment shown in FIG. 4.

FIGS. 7A and 7B show a schematic representation of one embodiment of the equipment of the invention, which provides for the reversal of the liquid flow by changing the position of the separation wall (position 1 or 2). Said embodiment is provided with a separation wall containing two perforated gas injection tubes, one on each side, only one of them being activated in accordance with the desired flow direction, it being known that it is the upward flow of bubbles that determines the liquid flow direction due to the air lift principle. In FIG. 7A, the separation wall is positioned at point 1 and the gas is inflated only on the left side of the equipment, providing liquid flow from left to right. In FIG. 7B, the separation wall is positioned at point 2 and the gas is only inflated at the right side of the equipment, providing liquid flow from right to left.

FIGS. 8A and 8B show a schematic representation of an alternative embodiment of gas/aeration injection pipe, which pivots or rotates along its radial axis, providing for the change in the direction of the upward flow of bubbles. In this embodiment, the separation wall is in a fixed position and the gas injection tube is positioned at the bottom end thereof, at the bottom and aligned with the wall. In FIG. 8A the liquid flow is directed from left to right by turning the gas injection tube to position 1. In FIG. 8B the liquid flow is directed from the right to the left by the rotation of the injection tube of to position 2.

FIGS. 9A and 9B show a schematic representation of another embodiment of the equipment, which provides for reversing the liquid flow without changing the position of the separation wall or rotating the gas/aeration injection tube. Said embodiment is provided with a separation wall and a single gas injection tube (91), above which there is a half channel that changes position to direct the gas to one side of the equipment, determining the direction of the liquid flow. In FIG. 9A, the half channel is positioned on the right side of the equipment so as to allow the flow of bubbles only from the left side, causing liquid flow to occur from the left (93) to the right (94). In FIG. 9B, the half channel is positioned on the left side of the equipment, so as to allow the flow of bubbles only on the right side, causing the liquid flow to occur from the right (93) to the left (94).

FIG. 11 shows a schematic representation of the pipes connected to one embodiment of equipment of the present invention submerged in a water tank. The arrows indicate the direction of incoming water flow (113) and exits the equipment (114), the gas inlet (111) and outlet (112) are also indicated. Also shown on the top are the left (115) and right (116) valves that provide the flow change or bi-directional flow, when both are open. In this embodiment, the flow direction change system is distinct from that described in FIGS. 9 and 10, being made by sliding plates which close either side of the equipment adjacent the central separation plate.

FIGS. 12A through 12C show in more detail the sliding separation plates depicted in FIG. 11. On the left FIG. 12A is shown the open position allowing the passage of gases on both sides of the equipment; in the center FIG. 12B is shown the position which provides the gas passage only on the right side of the equipment; to the right FIG. 12C is shown the position of the sliding plates which provides the gas passage only on the left side of the equipment.

In FIG. 14B are shown details of the valve system for the air insufflation tubes. With the valve 5 closed and the valves 1-2, 3-4 open, the equipment operates with two gas blowing pumps (pump 1, B1, and pump 2, B2), the liquid flow being upward on both sides of the equipment, which operates at its maximum capacity, the liquid containing the dissolved gas being extruded by the side pipes 6 and 7 shown in FIG. 13. With valve 5 open, at least four modes of operation are possible: (i) with valves 1, 2 and 4 open and valve 3 closed, only pump 1 inflates gas and feeds both sides of the equipment; (ii) with valves 2, 3 and 4 open and valve 1 closed, only pump 2 inflates gas and feeds both sides of the equipment; (iii) with valves 1 and 4 open and valves 2 and 3 closed, only pump 1 inflates air and feeds the right side of the equipment, while the left side serves for extravasation (in which case valves 6 and 7 shown in FIG. 13 are closed; (iv) with valves 3 and 2 open and valves 1 and 4 closed, only pump 2 inflates gas and feeds the left side of the equipment, while the right side serves for extravasation (in which case the valves 6 and 7 shown in FIG. 13 are closed). This arrangement of valves provides a lot of flexibility in operation, safety for the hypothesis of failure of one of the pumps and also reversal of the liquid flow to the operator's choice with simple valve changes. Those skilled in the art will readily know that automatic, pneumatic and/or electronic control systems of these valves are readily implementable from the present disclosure.

In FIG. 15A the side view (only half the equipment) and FIG. 15B the perspective view of the equipment as a whole is shown. In the cross-sectional view are shown: the gas inflating point (151) and ascending bubbles which subsequently pass through a cross-sectional restriction zone and then by the hive; the bubbles coalesce and explode at the end of the hive due to the increase of area; the liquid containing dissolved gases passes through the duct to the right of the hive, while the gas bubbles rise to the second stage and so on. At each stage, the rise of the bubbles causes the airlift effect, causing the volume of liquid equivalent to the volume of rising gas to be drawn upwards. Consequently, in this three stage embodiment, for every 1200 liters of air blown into the equipment, 3600 liters of water flow through the equipment and are completely saturated with oxygen, without requiring additional energy (relative to the one-stage configuration). Thus, with 0.5 HP of air pump power in the half of the equipment, 3600 liters of water per minute are completely saturated with oxygen. For equipment operated on both sides and two pumps (or a pump with double capacity), the equipment of this embodiment provides, with 1 HP of air pump power in the equipment, 7200 liters of water per minute fully saturated with oxygen.

In FIG. 16A there is shown an embodiment in which the water divisions and passages are angled and FIG. 16B such elements are more rounded.

in FIG. 27B a schematic representation of Enseada do Bom Jesus, in which a schematic representation of an embodiment of the invention provides increased oxygen dissolution rate, increase the total amount of oxygen dissolved in the liquid body and substantial decrease of energy for this purpose, being also adjustable to the tide conditions and other climatic conditions. According to data from INEA (2014), the most critical region of all Baia da Guanabara in terms of organic load is located around the Ilha do Fundão.

in FIG. 30A a boat (300) with center engine and (301) the hydrodynamic flow generated in the rear region of the boat, that is, after the propulsion effect. In FIG. 30B there is shown a schematic representation of this embodiment of the invention, in which a boat with center motor (300) comprises a micro bubble and/or thin liquid film generating device (302) fixed in a region posterior to the boat propeller, in order to take advantage of the hydrodynamic flow generated by the movement of the boat. Movement of the liquid within the device causes suction, with a vent above the surface of the liquid where the air enters the device (302) causing micro bubbles and/or thin liquid films to form in the water (303), aerating it.

DETAILED DESCRIPTION OF PREFERRED EMBODIMENTS

Figure 1:
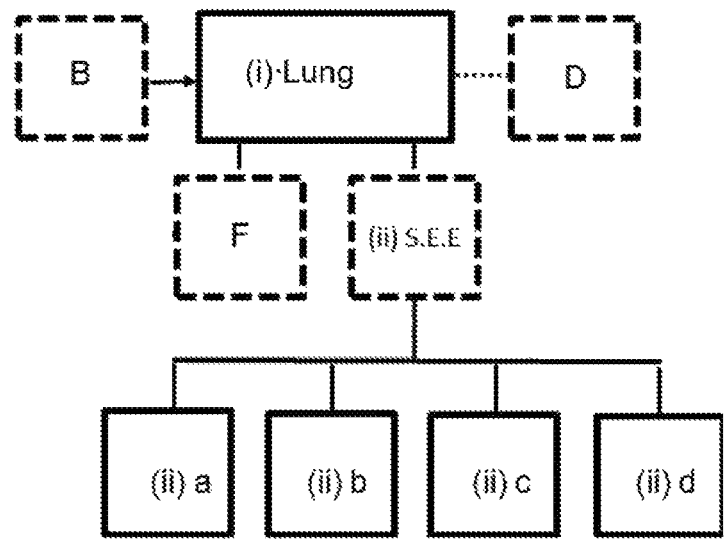
FIG. 1 schematically illustrates the inventive concept, in its different embodiments and applications, indicated: (i) Lung, one or more equipments of the invention for the massive dissolution of gases into liquids; B is an air or liquid pump, which is optional and used in some embodiments; D one or more devices selected from micro bubble generators, nanobubbles, thin liquid films, or combinations thereof, which is optional and used in some embodiments; F is a flotation device, which is optional and used in some embodiments, and may be a boat; (ii) S.E.E., one or more systems for energetically optimizing the introduction/dissolution of gas in the liquid selected from: (iia) one or more pump drive control systems, operating according to the availability of energy and/or their cost, or according to climatic, biological or geophysical cycles; (iib) one or more available kinetic or potential energy utilization systems, including gravity, existing air or liquid flows, such as boats, booster pumps, pneumatic devices; (iic) one or more energy generating subsystems, such as wind, solar, tidal flow, or chemical transformation, among others; and/or (iid) one or more ex situ microorganism enrichment subsystems, which provides the reduction of the gas dissolving demand in the liquid in question for the growth of microorganisms and therefore reduces overall energy consumption.
Figure 2A:
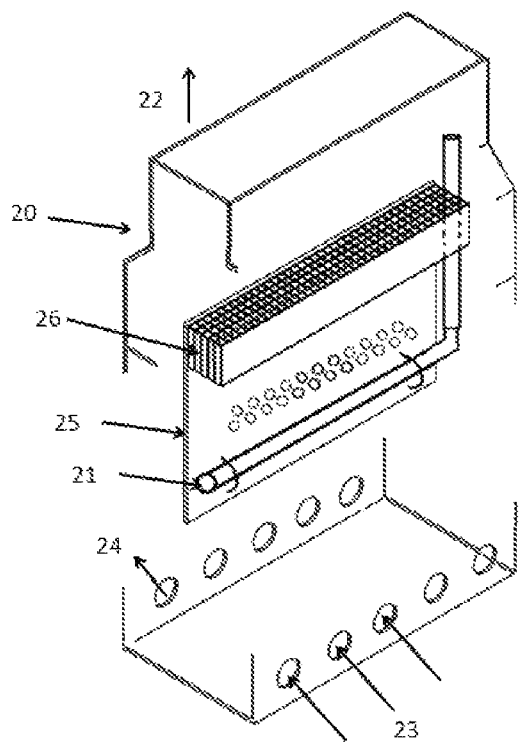
FIGS. 2A and 2B show schematic representations of an equipment embodiment of the invention.
Figure 2B:
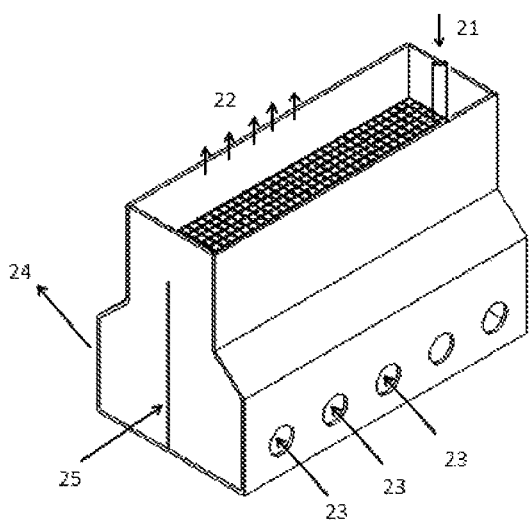

The inventive concept common to the various protection contexts of the present invention is equipment specifically developed for substantial increase of the amount and rate of dissolution of gases in such liquids. The equipment of the invention is capable of adjusting to different circumstances of operation and high energy efficiency, operating in an energetically autonomous manner or with reduced demand for external power supply. The equipment is particularly useful for the massive dissolution of gases into liquids and is therefore useful for the preservation and/or recovery of liquid bodies, improved efficiency of effluent treatment plants, aquaculture systems, $CO_2$ fixation systems, among others.

The equipment of the invention operates on the basis of the air lift principle in conjunction with the formation of thin liquid films and has the ability to dissolve more than 1000 L of gas per minute in the liquid, without defined limit of scale enlargement, since the sizing only depends on the configuration of the equipment. The equipment operates submerged in the liquid in which it is desired to dissolve the gas of interest. From the introduction of gas into a submerged zone inside the equipment, conventional gas bubbles formed ascend due to the natural thrust. By "conventional" in the present invention refers to bubbles formed without the need for high head loss associated with the formation of micro bubbles, for example. The ascending bubbles pass through one or more cross-sectional restriction zones, and then pass through a hive with an even smaller cross-sectional area in relation to the anterior zones, which promotes densification and/or coalescence of the bubbles. The bubbles then pass through a cross-sectional expansion zone, which promotes the expansion of bubbles, formation of thin liquid films and the explosion of such films. The liquid resulting from the bubble blast of the thin liquid film is saturated with the desired gases introduced and passes through a channel, by gravity, while the remaining gas released follows its ascending path. The rising released gas can pass through a new cycle equivalent to that previously described, with subsequent recovery of new amount of liquid saturated with the desired gases. In one embodiment, the gas is air and the liquid is water, but the invention is not limited to such substances.

Equipment for the massive dilution of gases into liquids comprises:
  a rigid body having a greater cross-sectional zone in the lower region and a region of smaller cross-sectional zone in the upper region, said rigid body comprising one or more liquid inlet regions in the lower portion; one or more liquid outlet regions at the top and/or bottom; and one or more gas outlet regions in the upper part, said rigid body containing, in its interior:
  one or more conventional gas bubble forming devices in the lower region;
  one or more thin liquid film forming hives, said hives having a plurality of inner channels having an even smaller cross-sectional area relative to the zone of smaller cross-sectional area in the upper region, the liquid in which the gas was dissolved being extravagated after passing through said hive.

In one embodiment, the rigid body of the equipment of the invention further comprises a separation wall therein, vertically dividing the rigid body at least partially into two regions.

In one embodiment, the equipment of the invention further comprises means for reversing the direction of the liquid flow passing in its interior. In one embodiment, said means for reversing the flow direction is selected from: rotation of a perforated tube to one or the other internal area of the equipment of the invention; use of a location changing physical barrier to divert the flow of gases to one or another internal area of the equipment of the invention; use of a perforated tube in each internal area of the equipment, selectively actuating one or other or both areas by means of valves; or combinations thereof.

In one embodiment, the equipment of the invention further comprises one or more sets of external pipes, connected to the liquid inlet and/or outlet.

In one embodiment, the equipment of the invention further comprises a gas suctioning or injecting means therein, the driving force of which is a liquid flow or drop in any liquid body.

In one embodiment, the equipment of the invention further comprises: (i) one or more gas in liquid dissolution devices selected from micro bubble generators, nanobubbles, thin liquid films, or combinations thereof; and/or (ii) one or more subsystems to energetically optimize the introduction/dissolution of gas into the liquid.

In one embodiment, said subsystems for energetically optimizing the introduction/dissolution of gas into the liquid are selected from: (iia) one or more pump drive control systems, operating according to the availability of energy and/or its cost, or according to climatic, biological or geophysical cycles; (iib) one or more available kinetic or potential energy utilization systems, including gravity, existing gas and/or liquid flows, such as water drop, river or boat engine flow, booster pumps and/or pneumatic devices; (iic) one or more energy generating subsystems, such as wind, solar, tidal flow, or chemical transformation, among others; and/or (iid) one or more ex situ micro-organism enrichment subsystems, which provides the energy demand reduction for the dissolution of gases in the liquid in question.

In one embodiment, the equipment of the invention further comprises flotation means and/or one or more gas and/or liquid pumps.

The process for the massive dilution of gases into liquids of the invention comprises the use of the equipment of the invention.

In one embodiment, the process of the invention comprises dissolution of oxygen in the air; of $CO_2$; ozone and/or other gases; and combinations thereof.

In one embodiment, the method of the invention further comprises: (i) the use of one or more gas in liquid dissolution devices, selected from micro bubble generators, nanobubbles, thin liquid films, or combinations of themselves; and/or (ii) the use of one or more subsystems to energetically optimize the introduction/dissolution of gas into the liquid.

The equipment of the invention provides much more flexibility of operation and a significant increase in the amount and rate of gas dissolution in the liquid body, and consequently of the organic load removal capacity. On the one hand, the amount of oxygen present in the air (21% by volume, 23% by weight) and the air density (approximately 1.2 kg/m$^3$), determine that each cubic meter of air has 276 g of $O_2$. On the other hand, 8.3 mg/L is the saturation limit of oxygen dissolved in fresh water at 25° C.; and 6.6 mg/L in seawater (35 ppm salinity), as shown in Tables 1 and 2 below, respectively.

TABLE 1

Solubility of Oxygen in fresh water (without salinity)

| Pressure abs | mm Hg | 760 | | | 1520 | | | 3040 | | |
|---|---|---|---|---|---|---|---|---|---|---|
| | Psi | 14.7 | | | 29.3 | | | 58.7 | | |
| | bar | 1 | | | 2 | | | 4 | | |
| | kPa | 101.1 | | | 202.2 | | | 404.3 | | |
| Temperature | | Solubility | | | | | | | | |
| °C. | °F. | μMol | mg/L | mL/L | μMol | mg/L | mL/L | μMol | mg/L | mL/L |
| 5 | 41 | 399 | 12.8 | 9.1 | 798 | 25.5 | 18.2 | 1595 | 51.1 | 36.4 |
| 10 | 50 | 353 | 11.3 | 8.2 | 705 | 22.6 | 16.4 | 1411 | 45.1 | 32.8 |
| 15 | 59 | 315 | 10.1 | 7.5 | 630 | 20.2 | 14.9 | 1260 | 40.3 | 29.8 |
| 20 | 68 | 284 | 9.1 | 6.8 | 568 | 18.2 | 13.7 | 1137 | 36.4 | 27.3 |
| 25 | 77 | 258 | 8.3 | 6.3 | 517 | 16.5 | 12.6 | 1034 | 33.1 | 25.3 |
| 30 | 86 | 236 | 7.6 | 5.9 | 473 | 15.2 | 11.8 | 947 | 30.3 | 23.6 |
| 35 | 95 | 218 | 7 | 5.5 | 436 | 14 | 11 | 872 | 27.9 | 22.1 |
| 40 | 104 | 202 | 6.5 | 5.2 | 404 | 12.9 | 10.4 | 808 | 25.9 | 20.8 |

TABLE 2

Solubility of Oxygen in seawater (salinity 35 ppm)

| Pressure abs | mm Hg | 760 | | | 1520 | | | 3040 | | |
|---|---|---|---|---|---|---|---|---|---|---|
| | psi | 14.7 | | | 29.3 | | | 58.7 | | |
| | bar | 1 | | | 2 | | | 4 | | |
| | kPa | 101.1 | | | 202.2 | | | 404.3 | | |
| Temperature | | Solubility | | | | | | | | |
| °C. | °F. | μMol | mg/L | mL/L | μMol | mg/L | mL/L | μMol | mg/L | mL/L |
| 5 | 41 | 308 | 9.9 | 7 | 616 | 19.7 | 14.1 | 1233 | 39 | 28 |
| 10 | 50 | 275 | 8.8 | 6.4 | 550 | 17.6 | 12.8 | 1099 | 35.2 | 25.6 |
| 15 | 59 | 248 | 7.9 | 5.9 | 495 | 15.9 | 11.7 | 991 | 31.7 | 23.4 |
| 20 | 68 | 225 | 7.2 | 5.4 | 450 | 14.4 | 10.8 | 901 | 28.8 | 21.7 |
| 25 | 77 | 206 | 6.6 | 5 | 413 | 13.2 | 10.1 | 826 | 26.4 | 20.2 |
| 30 | 86 | 190 | 6.1 | 4.7 | 381 | 12.2 | 9.5 | 761 | 24.4 | 18.9 |

TABLE 2-continued

| | | | | | | | | | | |
|---|---|---|---|---|---|---|---|---|---|---|
| 35 | 95 | 176 | 5.6 | 4.5 | 353 | 11.3 | 8.9 | 706 | 22.6 | 17.9 |
| 40 | 104 | 165 | 5.3 | 4.2 | 329 | 10.5 | 8.5 | 658 | 21.1 | 16.9 |

To the extent that the $O_2$ present in air is fully dissolved in water, every cubic meter of air totally dissolved in water represents the dissolution of 276 g of oxygen.

The application of the inventive concept of the invention solves various technical problems in the industry, including providing the high rate and dissolution and high amount of gases dissolved in liquids, with substantial reduction of the time to dissolution and energy consumption related to the introduction of gases (e.g., air) in the liquid body.

In one embodiment, the equipment of the invention is connected to an air pump; said pump may be supplied continuously with energy from a wind turbine, or may be driven/supplied at times of low demand (for example, at night, when the concentration of dissolved oxygen in ponds tends to decrease) in order to use energy that would not be used by the electrical system.

In another embodiment, the equipment of the invention operates autonomously and sustainably, that is, without external energy input, providing dissolution of gases in liquids in a continuous or semi-continuous manner without consumption of energy from external source.

In one embodiment, the equipment of the invention comprises a pump drive control subsystem that operates in accordance with fluid dynamics cycles and/or dimensions. This embodiment, described in more detail in at least one example in the section "detailed description of the invention" is particularly useful for increasing the efficiency and/or the reduction of the energy consumption for the dissolution of gases in open liquid bodies, as is the case of lagoons, coves, bays and the like.

In one embodiment, the equipment of the invention comprises an ex-situ microbial culture enrichment subsystem, for subsequent or concomitant re-introduction into said liquid body. This embodiment provides for the selection of specific microorganisms previously present in the ecological system of the liquid body, its enrichment and reintroduction in the liquid body, thereby reducing or avoiding undesirable environmental impact or risk, in addition to reducing the energy required for the dissolution of gases in the liquid body to be recovered due to the higher efficiency and recovery speed of the liquid body.

In the case of the use of the equipment and/or process of the invention for the conservation, recovery and/or bathing of liquid bodies such as ponds, rivers, lagoons and coves, the substantial increase of dissolution rate of oxygen in the liquid body, with low energy consumption for both and ability to adjust to the conditions of the place, offers several advantages. In addition to the above-mentioned advantages, in one embodiment the equipment and process of the invention provide conditions for the organisms present in the liquid body to have high metabolic activity under aerobic conditions, providing degradation or conversion of the organic load in an accelerated manner and without the introduction of exogenous substances or organisms.

Such embodiments, independently of one another, provide, among other advantages: higher rate (speed) of oxygen dissolution in the liquid bodies; greater capacity (quantity) of gas introduction into liquids; low energy consumption for the oxygen dissolution in the liquid body and/or substantial reduction in the need for external power supply; adjustment to environmental conditions; or both.

These advantages provide: higher environmental quality, productivity and efficiency in aquaculture processes; higher speed and efficiency and lower energy consumption in the removal of organic loads from liquid bodies; reduction or elimination of undesired or risk environmental impact. The invention also provides for selection of aeration regimes compatible with the biological cycles to be promoted; strategy of use and reintroduction of specific microorganisms to act in the liquid body; selection of microorganism concentration ranges to act in the liquid body; selection of the moment at which such organisms are added; the high change rate of microorganisms concentration in the liquid body, which makes it possible to adjust the remediation process according to variations in the organic load of the input material in the liquid body; high rate of metabolism of ex situ cultured microorganisms and adapted to the ecological conditions of the site to degrade and/or transform the undesirable substances in the liquid body. These factors, separately or in combination, provide reduction of recovery times of the liquid body; substantial performance increase of bioremediation systems.

Besides the present invention providing a solution to the problem of the high energy amount required for the dissolution of gases into liquids, it contributes in this process both by preventing the formation of undesirable gases and by providing its removal (such as methane, $H_2S$ and others), through the equipment of the invention.

The equipment of the invention provides an efficient and advantageous approach for the bioremediation of liquid bodies.

Approaches known in the prior art do not provide the same technical effects as the invention. Furthermore, the approaches do not provide all the technical effects of the invention concomitantly: the high change rate of gas concentration in the liquid body, the high total amount of gases effectively dissolved in time, the adjustment of the gas dissolution process according to the existing organic loads or variations of the organic load of entry, as is the case of certain areas or coves in the Baía of Guanabara, for example; reducing the recovery times of the liquid body; the reduction or elimination of external energy consumption. The equipment of the invention provides much more flexibility of operation than conventional ones and a significant increase in the capacity and speed of organic load removal due to the large, fast and energetically efficient dissolution of gases such as oxygen to the liquid bodies.

The process of the invention is applicable, among others, to the conservation and/or recovery of lakes, rivers, lagoons, coves, beaches and mangroves.

The following examples are only intended to exemplify some of the innumerable ways of realizing the invention without, however, limiting the scope thereof.

Example 1. Equipment for the Massive Dissolution of Gases in Liquids

Figure 3A:
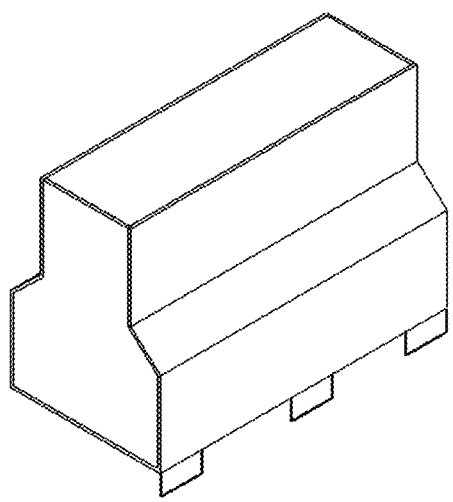
FIGS. 3A through 3D show an embodiment of the equipment of the present invention.
Figure 3B:
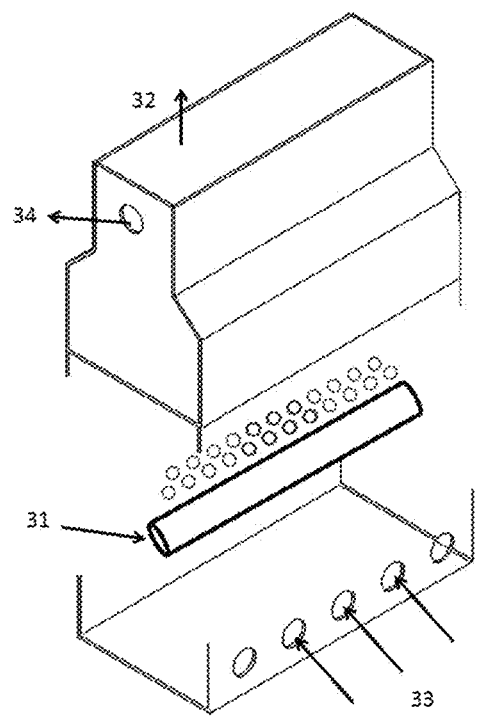
Figure 3C:
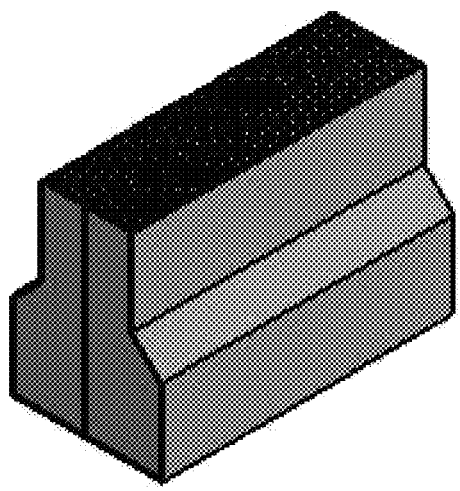
Figure 3D:
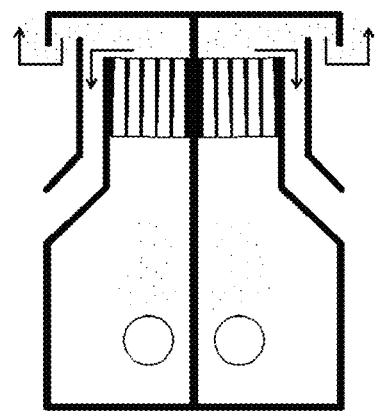

FIGS. 3A through 3D show one embodiment of the equipment of the present invention. In FIG. 3A is shown equipment in the form of pyramidal trunk with dimensions of 60×44×100 cm, respectively height, width and length. The top is 15 cm wide. This pyramidal trunk configuration provides stability in riverbeds or water courses and also the rise of conventional air bubbles blown into the equipment, its passage through the reduction of cross-section and subsequent passage through the hive through which the bubbles coalesce and form thin liquid films. The liquid bubbles in the film rupture after passing through the hive, so that the liquid saturated with new gases flows out through the side duct as indicated. The remaining gases are released through the upper opening. This equipment embodiment of the invention provides full saturation capacity of desirable gases (or aeration) in the liquid of up to 2400 liters of liquid per minute. In this embodiment, the equipment operates with two blowers, each of CV-51M (SNatural) model, of 0.5 CV and with flow capacity of 1200 liters of air per minute, pressure of 1200 mm of water column, blowing air through a 100 mm pipe drilled on each side of the separation wall, with 1 mm holes. In FIG. 3B there is shown a schematic representation of this equipment embodiment of the invention in exploded version, the water inlet ducts (33) and the drilled duct (31) for blowing gas are shown, as well as, on top, the gasifying/aerated liquid outlets (34) and the waste gas (32). In FIG. 3C there is shown a perspective view of this equipment embodiment of the invention, the top surface being the area where two hives are located (one on each side of the central separation wall) each containing 7 cm depth and width, and 100 cm in length. Each quadrangular opening of the hive has an area of 1 cm$^2$. In FIG. 3D there is shown a side cross-sectional view of this equipment embodiment of the invention, where positions are indicated where the two perforated tubes are placed for gas insufflation (below), and bubble rise. The arrows indicate the liquid flows caused by the rise of the bubbles, which pass through the hives and pass through the sides.

The equipment of this embodiment or any of its embodiments provides much more flexibility of operation and a significant increase in the amount and rate of dissolution of gases in liquid, and consequently of the unwanted organic load removal capacity. On the one hand, the amount of oxygen present in the air (21% by volume, 23% by weight) and the air density (approximately 1.2 kg/m$^3$), determine that each cubic meter of air has 276 g of O2. On the other hand, 8.3 mg/L is the oxygen saturation limit dissolved in fresh water at 25° C.

This equipment embodiment of the invention (a thin film forming stage, 1200 liters of air injection per minute) provides a saturation capacity of 1200 liters of water per minute, which amounts to dissolution of up to 9.6 g of $O_2$ per minute at the energy cost of 0.5 HP.

Figure 4:
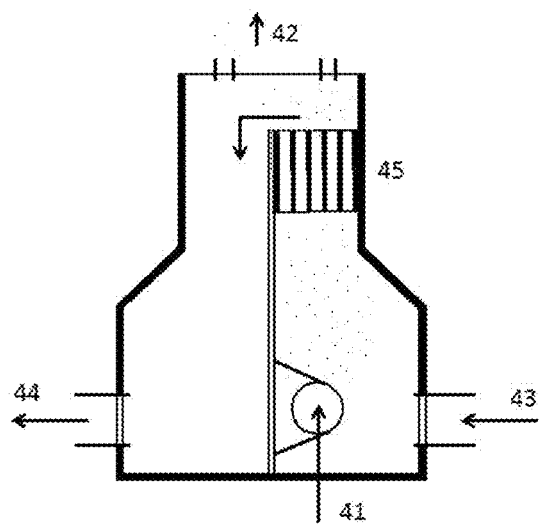
FIG. 4 shows a side view of an equipment according to FIGS. 3A through 3D, but in a configuration with a separation wall containing only one hive (45) on the right side, so that the gas inflating by the right side creates bubbles rise and thereby generates an upward flow of liquid (43), which passes through the hive and outflows to the left side (44). In this embodiment, the equipment operates with a CV-51M (SNatural) blower of 0.5 CV and with a flow capacity of 1200 liters of gas per minute, a pressure of 1200 mm of water column, on the sides of the separation wall, gases through a perforated tube (41) 100 cm. This configuration provides complete gasifying/aeration capability of liquid is up to 1200 liters per minute, flowing from right to left.

Example 2. Equipment for the Massive Dilution of Gases into Liquids Having Means for Changing the Liquid Flow Direction In some equipment embodiments of the invention, hereinafter illustrated in conjunction with FIGS. 4-14, an additional technical advantage is obtained. Control of the liquid flow direction within a liquid body, without requiring additional energy in relation to that already used for aeration of the liquid. FIG. 4 shows a cross-sectional side view of an equipment according to FIGS. 3A through 3D, but in a configuration with a separation wall containing only one hive (45) on the right side, so that the gas insufflation on the right side generates ascending bubbles and thereby generates an upward flow of liquid (43), which passes through the hive and flows out to the left side (44). In this embodiment, the equipment operates with a CV-51M (SNatural) blower of 0.5 CV and with a flow capacity of 1200 liters of gas per minute, a pressure of 1200 mm of water column, on the sides of the separation wall, gases through a perforated tube (41) 100 cm. This configuration provides full gasification/aeration capability of liquid is up to 1200 liters per minute, flowing from right to left.

Figure 5A:
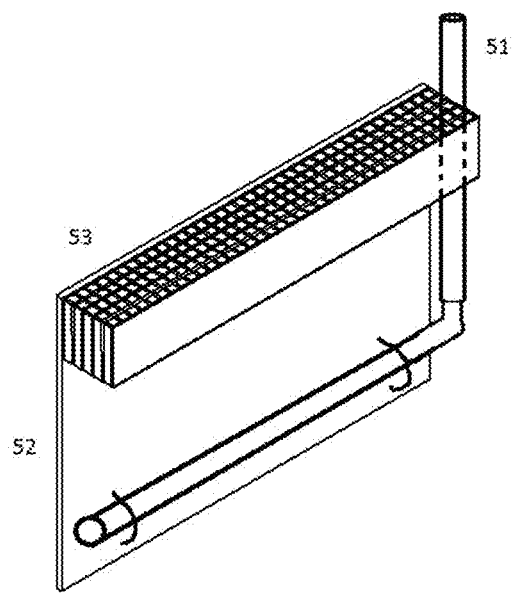
FIGS. 5A through 5C show details of the separation wall used in the middle of the equipment described in FIG. 4.
Figure 5B:
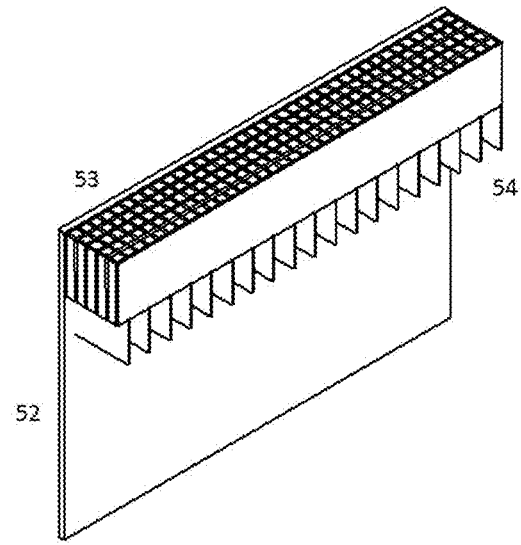
Figure 5C:

FIGS. 5A through 5C show details of the separation wall used in the middle of the equipment described in FIG. 4. In FIG. 5A is shown below a perforated tubing (51) for the gas insufflation in the lower part and, in the upper part, the details of the hive (53) through which the liquid and the conventional bubbles pass, forming thin liquid films at the end. The perspective view shows only one side, as used in FIG. 4, but the separation wall 52 may have a hive and a perforated tube also on the other side, as shown in FIG. 3D. In FIG. 5B details of another separation wall embodiment 52 used in the equipment described in FIGS. 3A through 3D or FIG. 4 are shown, showing in the upper part details of the hive (53) where the liquid and the conventional bubbles pass, forming the thin liquid films and just below the hive several small extensions (54) vertically to provide dimensional separation of the liquid zones and ascending bubbles. Such extensions are distributed along the length of the separation wall, perpendicular thereto.

FIG. 6 shows details of another equipment embodiment of the invention (only half of the equipment being shown), provided with an additional partition (63) to provide dimensional separation of the liquid zones and ascending bubbles. Said additional partition is unique and disposed along the extent of the separation wall, parallel thereto in one dimension and angled in another, to proportionally divide the upward flow area of liquid and bubbles. This configuration is conveniently used in conjunction with the embodiment shown in FIG. 4.

FIGS. 7A and 7B a schematic representation of one equipment embodiment of the invention, which provides for the reversal of the liquid flow by changing the position of the separation wall (position 1 or 2). Said embodiment is provided with a separation wall containing two perforated gas injection tubes, one on each side, only one of them being activated in accordance with the desired flow direction, knowing that it is the ascending flow of bubbles that determines the flow direction due to the air lift principle. In FIG. 7A, the separation wall is positioned at point 1 and the gas is inflated only on the left side of the equipment, providing liquid flow from left to right. In FIG. 7B, the separation wall is positioned at point 2 and the gas is only inflated at the right side of the equipment, providing liquid flow from right to left.

FIGS. 8A and 8B show a schematic representation of an alternate embodiment of gas/aeration injection tube, which pivots or rotates along its radial axis, providing for the change of ascending bubbles flow direction. In this embodiment, the separation wall is in a fixed position and the gas injection tube is positioned at the lower end thereof, at the bottom and aligned with the wall. In FIG. 8A the liquid flow is directed from left to right by turning the gas injection tube to position 1. In FIG. 8B the liquid flow is directed from the right to the left by the rotation of the injection tube of to position 2.

FIGS. 9A and 9B show a schematic representation of another embodiment of the equipment, which provides for the reversal of the liquid flow without changing position of the separation wall or of the gas/aeration injection tube. Said embodiment is provided with a separation wall and a single gas injection tube (91), above which there is a half channel that changes position to direct the gas to one side of the equipment, determining the direction of the liquid flow. In FIG. 9A, the half channel is positioned on the right side of the equipment so as to allow the flow of bubbles only from the left side, causing liquid flow to occur from the left (93) to the right (94). In FIG. 9B, the half channel is positioned on the left side of the equipment, so as to allow the flow of bubbles only on the right side, causing the liquid flow to occur from the right (93) to the left (94).

Figure 10:
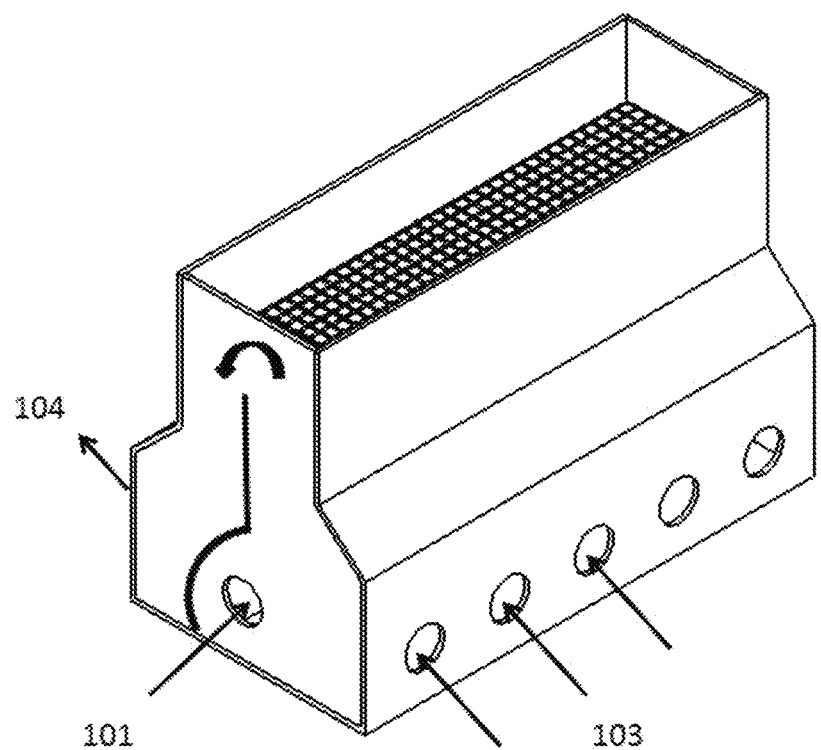
FIG. 10 shows a perspective view of an embodiment of equipment the configuration of which is according to FIG. 3A or FIG. 9B, showing the half channel positioned on the left side and the liquid flow from the right (103) to the left (104).

FIG. 10 shows a perspective view of an equipment embodiment the configuration of which is according to FIG. 3A or FIG. 9B, showing the half channel positioned on the left side and the liquid flow from the right (103) to the left (104).

FIG. 11 shows a schematic representation of the pipes connected to one equipment embodiment of the present invention submerged in a water tank. The arrows indicate the direction of incoming water flow (113) and exits the equipment (114), the gas inlet (111) and outlet (112) are also indicated. Also shown on the top are the left (115) and right (116) valves that provide the flow change or bi-directional flow, when both are open. In this embodiment, the flow direction change system is different from that described in FIGS. 9-10, being made by sliding plates which close either side of the equipment adjacent the central separation plate.

FIGS. 12A through 12C show in more detail the sliding separation plates depicted in FIG. 11. On the left FIG. 12A is shown the open position allowing the passage of gases on both sides of the equipment; in the center FIG. 12B is shown the position that provides the passage of gas only on the right side of the equipment; to the right FIG. 12C is shown the position of the sliding plates which provides the gas passage only on the left side of the equipment.

Figure 13:
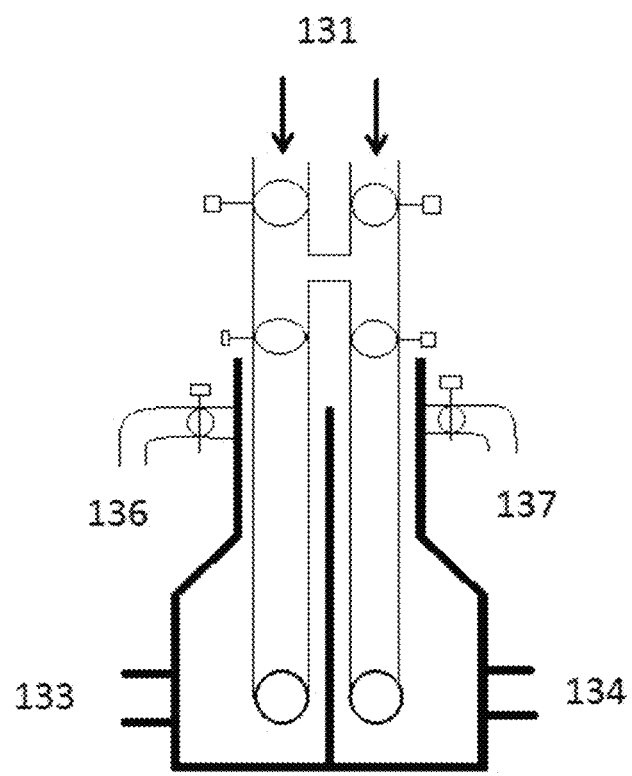
FIG. 13 shows a cross-sectional view of another embodiment of the equipment of the invention, two gasification/insufflation ducts being shown near the inner central region of the equipment, two tubing provided with valves (one on the left, 136, the other on the right, 137) for the aerated liquid extravasation and a five-valve system in the gas insufflating pipes (131), for control of the inflation direction and consequently of the liquid flow.

FIG. 13 shows a cross-sectional view of another equipment embodiment of the invention, two gasification/insufflation ducts being shown near the inner central region of the equipment, two tubing provided with valves (one on the left, 136, the other on the right, 137) for the aerated liquid extravasation and a five-valve system in the gas insufflation pipes (131), for control of the insufflation direction and consequently of the liquid flow.

Figure 14A:
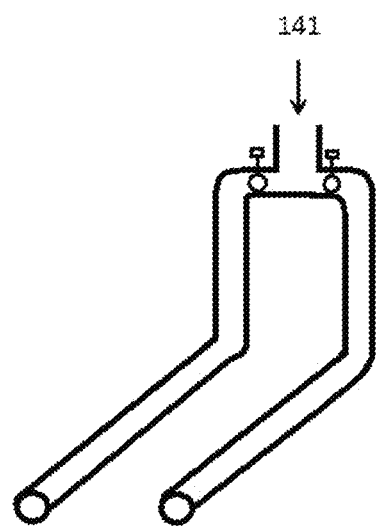
FIGS. 14A and 14B show in FIG. 14A details of the gasification/insufflation air tubes (141) in a perspective view without the remainder of the equipment described in FIG. 13.
Figure 14B:
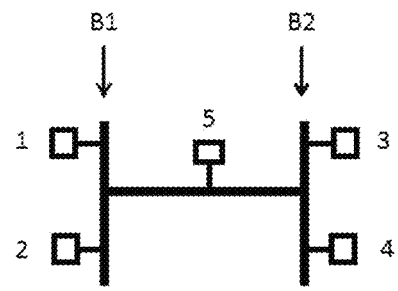

FIGS. 14A and 14B show in FIG. 14A details of the air gasification/insufflation tubes (141) in a perspective view without the remainder of the equipment described in FIG. 13. In FIG. 14B there are shown details of the valve system for the air insufflation tubes. With the valve 5 closed and the valves 1-2, 3-4 open, the equipment operates with two gas blowing pumps (pump 1, B1, and pump 2, B2), the liquid flow being upward on both sides of the equipment, which operates at its maximum capacity, the liquid containing the dissolved gas being extruded by the side tubes 6 and 7 shown in FIG. 13. With valve 5 open, at least four modes of operation are possible: (i) with valves 1, 2 and 4 open and valve 3 closed, only pump 1 inflates gas and feeds both sides of the equipment; (ii) with valves 2, 3 and 4 open and valve 1 closed, only pump 2 inflates gas and feeds both sides of the equipment; (iii) with valves 1 and 4 open and valves 2 and 3 closed, only pump 1 inflates air and feeds the right side of the equipment, while the left side serves for extravasation (situation in which valves 6 and 7 shown in 13 are closed); (iv) with the valves 3 and 2 open and the valves 1 and 4 closed, only the pump 2 inflates gas and feeds the left side of the equipment, while the right side serves for extravasation (situation in which valves 6 and 7 shown in FIG. 13 are closed). This arrangement of valves provides a lot of flexibility in operation, safety for the hypothesis of failure of one of the pumps and also reversion of the liquid flow to the operator's choice with simple valve changes. Those skilled in the art will readily know that automatic, pneumatic and/or electronic control systems of these valves are readily implementable from the present disclosure.

Figure 15A:
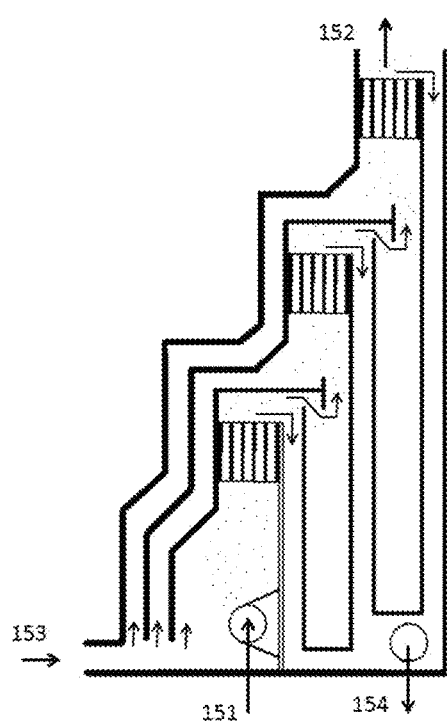
FIGS. 15A and 15B show a schematic representation of another embodiment of the invention equipment, which is provided with three consecutive stages of hives for the formation of thin films.
Figure 15B:
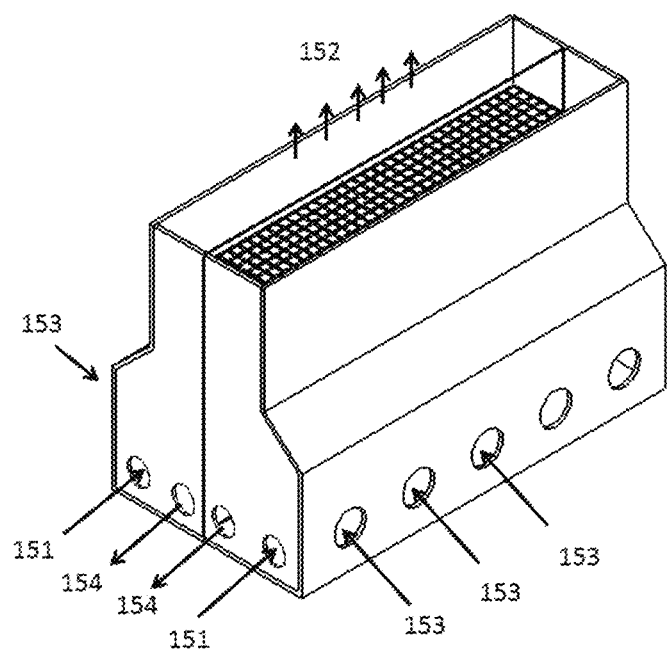

Example 3. Equipment for the Massive Dissolution of Gases into Liquids with Multiple Stages FIGS. 15A and 15B show a schematic representation of another equipment embodiment of the invention, which is provided with three consecutive stages of hives for the formation of thin films. In FIG. 15A the side cross-sectional view (only half the equipment) and FIG. 15B the perspective view of the equipment as a whole is shown. In the cross-sectional view are shown: the gas inflating point (151) and ascending bubbles which subsequently pass through a cross-sectional restriction zone and then by the hive; the bubbles coalesce and explode at the end of the hive due to the increase of area; the liquid containing dissolved gases passes through the duct to the right of the hive, while the gas bubbles rise to the second stage and so on. At each stage, the rise of the bubbles causes the airlift effect, causing the volume of liquid equivalent to the volume of rising gas to be swept up. Consequently, in this three stage embodiment, for every 1200 liters of air blown into the equipment, 3600 liters of water flow through the equipment and are completely saturated with oxygen, without requiring additional energy (relative to the one-stage configuration). Thus, with 0.5 HP of air pump power in the half of the equipment, 3600 liters of water per minute are fully saturated with oxygen. For equipment operated on both sides and two pumps (or a pump with double capacity), the equipment of this embodiment provides, with 1 HP of air pump power in the equipment, 7200 liters of water per minute fully saturated with oxygen.

Figure 16A:
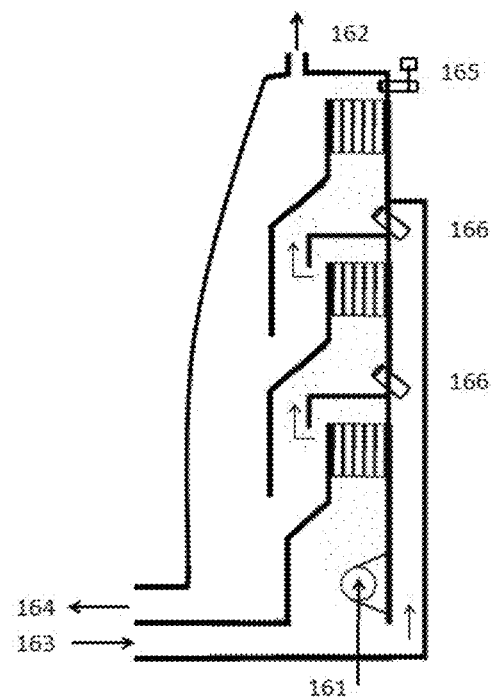
FIGS. 16A and 16B show two schematic side views of other equipment embodiments of the invention (shown only the left half), both with three successive stages of thin film formation. In both cases, the water inlets to be aerated are made by the central region of the equipment, as opposed to the embodiment of FIGS. 15A and 15B, in which this is done by the sides.
Figure 16B:
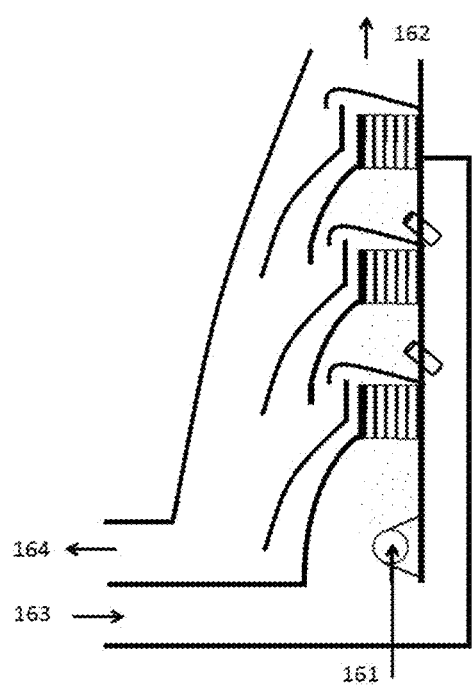

FIGS. 16A and 16B show two schematic side cross-sectional views of other equipment embodiments of the invention (shown only the left half), both with three successive stages of thin film forming. In both cases, the inlets of water to be aerated are made by the central region of the equipment, as opposed to the embodiment of FIGS. 15A and 15B, in which this is done by the sides. In FIG. 16A there is shown an embodiment in which the divisions and passages of water are angled and in FIG. 16B such elements are more rounded.

Figure 17:
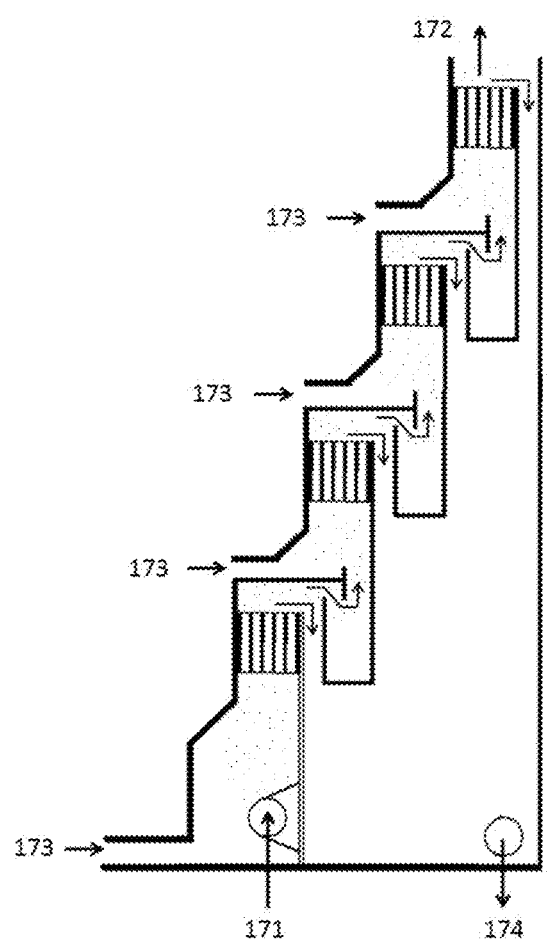
FIG. 17 illustrates yet another equipment embodiment of the invention, which shows a side view of only half of the equipment. In this embodiment four successive thin film forming stages are shown, which (for the same dimensions shown in FIGS. 3A though 3D, the equipment provides, with 0.5 HP of air pump power in the half of the equipment, complete oxygen saturation of 4800 liters of water per minute). For equipment operated on both sides and two pumps (or a pump with double capacity), the equipment of this embodiment provides, with 1 HP of air pump power in the equipment, 9600 liters of water per minute fully saturated with oxygen. An embodiment of larger dimensions comprising a hive 52.5 cm wide, 7 cm deep and 200 cm long (or two hives with one half the size each) and the rigid body having a conical trunk shape 200 cm in length, 100 cm high and 150 cm wide, has complete aeration capacity, or full saturation of water with air oxygen, of 1 m³/s of water. For this purpose, the energy demand is of the order of 10 HP or 7.5 kW when one or more blower are used driven by the external electric energy. This configuration provides the dissolution of 38.6 g of $O_2$/s, 138.9 kg of $O_2$/h, or 3.33 ton of $O_2$/day, which equals the daily organic load (BOD) of domestic sewage of a population of 62 thousand inhabitants (basis of 54 grams daily BOD per inhabitant, by IMHOFF in 2000).

FIG. 17 illustrates yet another equipment embodiment of the invention, which shows a side cross-sectional view of only half of the equipment. In this embodiment four successive thin film forming stages are shown, which (for the same dimensions depicted in FIGS. 3A through 3D) provide, with 0.5 HP of air pump power in the half of the equipment, the full oxygen saturation of 4800 liters of water per minute. For equipment operated on both sides and two pumps (or a pump with double capacity), the equipment of this embodiment provides, with 1 HP of air pump power in the equipment, 9600 liters of water per minute fully saturated with oxygen. For equipment operated on both sides and two pumps (or a pump with double capacity), the equipment of this embodiment provides, with 1 HP of air pump power in the equipment, 9600 liters of water per minute fully saturated with oxygen. The equipment of this embodiment provides the dissolution of 14% of the air injected on each side, that is, for 1200 liters of air injected per minute on each side of the equipment, 4800 liters per minute of water are saturated with oxygen. The equipment of this embodiment thus provides the dissolution of up to 76.8 g of $O_2$ per minute and saturates with oxygen 9600 liters of water per minute at the energy cost of 1 HP.

Tests performed with water collected from the Cunha channel, a very bed-smelling water due to the emission of hydrogen sulfide gas, have demonstrated that odor elimination occurred within the first hour of forced aeration with the equipment of this embodiment of the invention.

It should be noted that the equipment of the invention provides for the adjustment of the dissolution of gases in the liquid proportionally to the demand of oxygen in the place and/or the desired time of recovery—the same being valid for larger areas. Subsequently, those skilled in the art will know, from the teachings presented herein, that the equipment not only promotes the efficiency and competitiveness increase of companies operating in the environmental sanitation segment, but also the revitalization of areas whose economic activity is stagnant in part or completely due to environmental degradation. The use of the equipment, adapted to each situation that requires aeration/oxygenation, at different scales, provides for the recovery of liquid bodies such as the depollution of Baía de Guanabara (and other bodies such as ponds, lakes in parks, etc.), processes widely favored in healthy and aerobic environment as well as potentially in polluted water treatment and reutilization as reuse water in supply systems.

Figure 22:
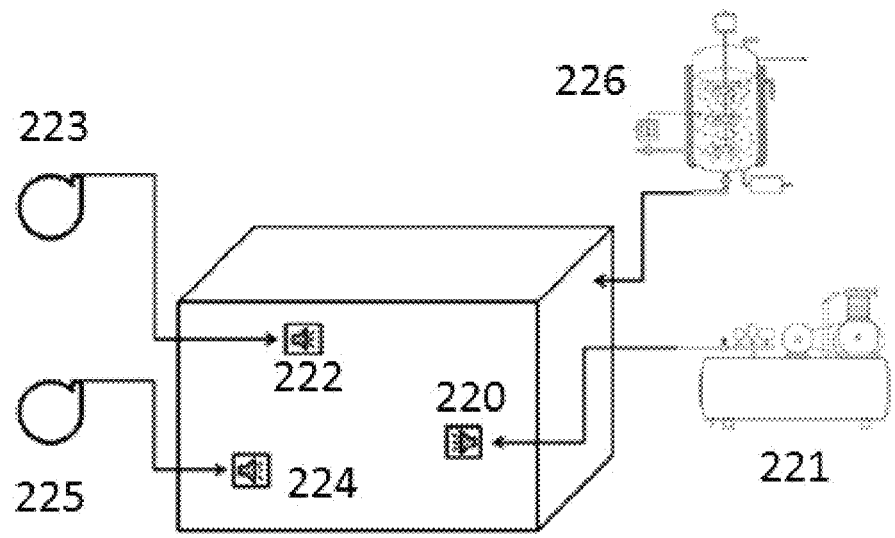
FIG. 22 schematically illustrates a process embodiment of the invention in which a liquid body of 1000 L receives gas dissolution with: (i) equipment (220) according to FIGS. 3A through 3D, connected to a compressor (221) of clean air (Schulz); (ii) an arrangement of two gas in liquid dissolution devices, a micro bubble generating device (222) model BT-50 (Riverforest Corporation) in hydraulic connection with a liquid pump (223) of 0.5 HP (WEG), and a FBT-50 (Riverforest Corporation) liquid micro bubble and thin film (224) generating device connected hydraulically to a 0.5 HP (WEG) liquid pump (225); and (iii) an ex situ microorganism enrichment subsystem (226) (B Braun), which provides additional energy demand reduction for the dissolution of gases in the liquid in question, since ex situ enrichment does not require further dissolution of gas in situ.

Example 4. Equipment and Process for the Conservation and/or Recovery of Liquid Bodies FIG. 22 schematically illustrates a process embodiment of the invention in which a liquid body of 1000 L receives gas dissolution with: (i) equipment (220) according to FIGS. 3A through 3D, connected to a compressor (221) of clean air (Schulz); (ii) an arrangement of two gas in liquid dissolution devices, being a micro bubble generating device (222) from model BT-50 (Riverforest Corporation) in hydraulic connection with a liquid pump (223) of 0.5 HP (WEG), and a micro bubble and thin liquid film generating device (224) model FBT-50 (Riverforest Corporation) connected hydraulically to a 0.5 HP (WEG) liquid pump (225); and (iii) an ex situ micro-organism enrichment subsystem (B Braun) (226), which provides additional energy demand reduction for the dissolution of gases in the liquid in question, since ex situ enrichment does not require additional gasification in situ.

Tests performed in the laboratory with the equipment of this embodiment of the invention indicate an efficiency of 70% dissolution of the air with the equipment, and may be greater depending on the operating conditions. In these conditions, the equipment of the invention provides, for the injection of each cubic meter of air into the liquid, dissolution of 193.2 g of $O_2$ (and 161.2 g of $O_2$ for the use of high humidity air, whose density is of about 1 kg/m³ of air).

Additional tests performed with water collected from Cunha channel, a very bad-smelling water due to the emission of hydrogen sulfide gas, demonstrated that odor elimination occurred within the first hour of aeration forced with the equipment of this embodiment of the invention.

Example 5. Equipment with Power Generation Subsystem

Figure 29:
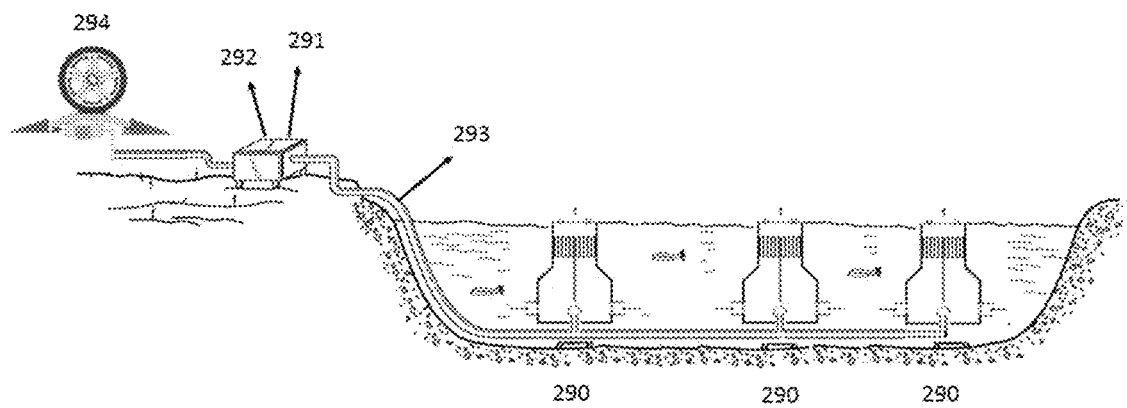
FIG. 29 shows a schematic representation of another embodiment of the invention, in which the equipment and process of the invention are used for increasing the dissolved oxygen level and water quality of a river alongside a highway or avenue. There are shown: three equipment units of the invention (290), each with aeration capacity of 2400 L of water per minute, placed in the liquid body; the schematic representation of an air pump or air compressor (291) with air insufflation capacity of 7200 L of air per minute, optionally including a drive/pump adjusting/compressor controller (292) for moments of aeration demand in the liquid body; the air tubing (293) connecting the pump/air compressor (291) to the equipments (290) for massive dilution of air in the liquid; and an electric power generating spine (294) for feeding the pump (291). The spine (294) optionally is a pneumatic spine which feeds the compressor (291) directly with air.

Advantages similar to those provided by the equipment of the foregoing examples are provided by the equipment of another embodiment of the invention, schematically shown in FIG. 29, showing an embodiment of equipment (290) of the invention used for increasing the level of oxygen dissolved and water quality of a lagoon. In this embodiment, two 7.5 HP air pumps (291) are used, each with an air inflation capacity of 7 m³/min. Said pumps are controlled by a drive device that switches power from a 2MW wind turbine (94) from the power grid to the pumps, preferably during times of low power demand in the grid and, therefore, greater power availability. Connected by tubes to said air pumps (291) seven equipments (290) of the invention with a capacity of 2000 L/min (each) of air/oxygen dissolution in the lagoon water. The Marcelino Ramos Lagoon in the Complexo Lagunar de Osório (RS) has BOD of approximately 10 mg/L (Lissner & Gruber, 2009). The region is also known for the widespread proliferation of algae, which produce oxygen during the day—but consume it at night, causing substantial drop in oxygen concentration dissolved overnight. Consequently, operation of the invention equipment at night contributes to solving the environmental problem and also not to burden the power grid either by using a wind energy generator or by making it entirely available to supply power to the grid during the day.

Operating for 8 consecutive hours overnight, the seven equipments of the invention used in this process provide for the dissolution of 65 kg of $O_2$ per night at an energy consumption of about 11.2 kW, i.e. 0.05% of the capacity of single wind turbine, such as that available at the Osório wind farm, which has a total of 75 wind turbines of 2MW each, i.e. the energy consumption of the equipment to operate under these conditions is only 0.00066% of the energy generation capacity of said wind farm. In this operating regime, the amount of oxygen returned to said Lagoon corresponds to the treatment of approximately 6,500 m³ of water (with BOD 10) per night in an 8 hour operating regime, i.e. the process of the invention of this embodiment satisfies the entire demand oxygen biochemistry (BOD) of a volume of 6,500 m³ per night cycle.

Example 6. Equipment and Process for Water Quality Conservation and Productivity Improvement in Aquaculture Systems Intensive food production requires a substantially large amount of water and it is well known that water consumption in agriculture and livestock can compete with the use of water for human consumption. An alternative that has been growing substantially in the world, including in Brazil, is Aquaculture, a production system of food grown in aquatic environments. Among other examples, the production of fish is worthy of note because it is a source of protein and because it has a high capacity of expansion of scale, especially in Brazil.

However, large-scale fish production—and especially the increased productivity of these aquaculture processes—faces technical problems related to oxygen consumption in these liquid bodies and the production of organic load in water, whether due to the large amount of fish, the organic load produced by them, or both concurrently. Such problems greatly limit the productivity of such processes, as well as generate environmental problems due to the organic load discarded, the use of more clean water, and the frequent operational needs of water exchange. In addition, these technical problems impair the quality of the water and consequently the fish that live in it, as well as limit the growth rate of the fish. The present invention provides a solution to these problems.

Figure 18:
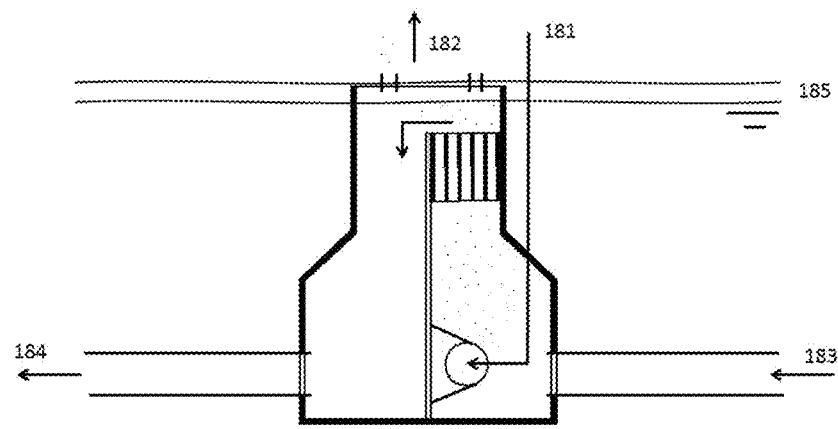
FIG. 18 shows a schematic representation of a process embodiment of the invention, in which equipment according to FIG. 4 is installed in a fish culture tank. The details of the pipe installations (181, 183, 184) and the position of the equipment relative to the water level (185) are shown.

FIG. 18 shows a schematic representation of a process embodiment of the invention, in which equipment according to FIG. 4 is installed in a fish culture tank (Tambaquis). The details of the tube installations (181, 183, 184) and the position of the equipment relative to the water level (185) are shown.

Figure 20:
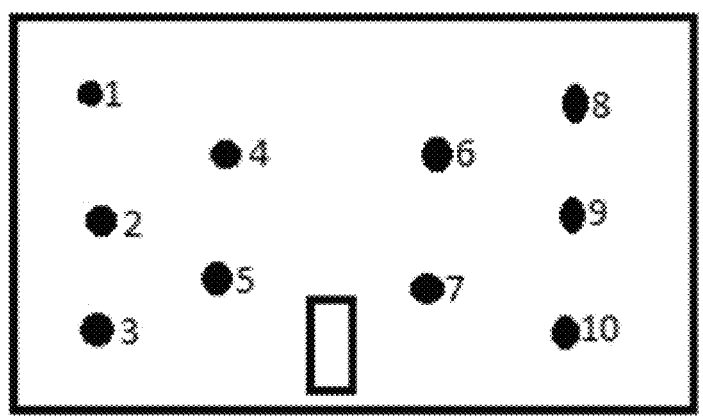
FIG. 20 shows a schematic representation of a gas exchange process in a culture tank for aquaculture, seen from above. The representation shows an equipment according to FIG. 4, with full gas dissolution capacity (saturation with the desired gases) of 1000 liters per minute of water, installed in a 40 m×30 m aquaculture tank. Points 1-10 indicate the start or end positions of the pipes that connect to the equipment of the invention. The inlets and outlets are chosen to maximize the homogenization of the liquid from the tank, alternating the places where the liquid is sucked (not yet aerated) and the discharge of the already aerated liquid. In this arrangement, point 1 is the discharge site of aerated liquid withdrawn from point 7; point 2 is the place of suction of water still not aerated, the discharge of aerated water being made at point 6; point 3 is the discharge site of aerated liquid withdrawn from point 10; point 4 is the location of suction of water not yet aerated, the discharge of aerated water being made at point 9; point 5 is the discharge point of the aerated liquid withdrawn from point 8.
Figure 21:
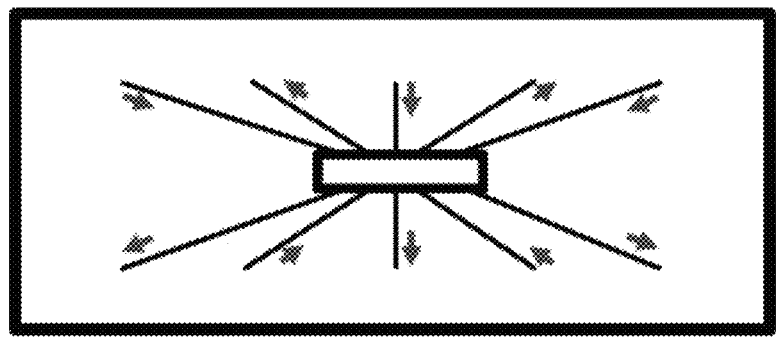
FIG. 21 shows a schematic representation of another arrangement of pipes connected to equipment used in a process embodiment of the present invention. The arrows indicate the direction of the flow of water entering and leaving the equipment.

FIG. 20 shows a schematic representation of a gas exchange process in a culture tank for aquaculture, seen from above. The embodiment shows equipment according to FIG. 4, with full gas dissolution capacity (saturation with the desired gases) in 1200 liters per minute of water, installed in a 40 m×30 m aquaculture tank of size. Points 1-10 indicate the start or end positions of the tubes connecting to the equipment of the invention. The inlets and outlets are chosen to maximize the homogenization of the liquid from the tank, alternating the places where the liquid is sucked (not yet aerated) and the discharge of the already aerated liquid. In this arrangement, point 1 is the discharge site of gaseous liquid suctioned from point 7; point 2 is the place of suction of water still not aerated, the discharge of aerated water being made at point 6; point 3 is the discharge site of gaseous liquid suctioned from point 10; point 4 is the place of suction of water not yet aerated, the discharge of aerated water being made at point 9; point 5 is the discharge point of the gaseous liquid suctioned from point 8.

In this embodiment, the equipment of the invention is applied to the conservation/oxygenation of a 12,500 m$^3$ tank of water for the production of fish, and comprises: two 0.5 HP air pumps with a capacity of insufflation of 1.2 m$^3$/min of air in the tank each (operating in redundancy with supplementary pumps, in case of failure of one pump to another to act immediately or quickly). The said pump are controlled by a drive device which switches on the supply of two 1 kW wind turbines, model Gerar 246 (Enersud); a set of 10 Yingli solar panels of 250 W each; and/or a 4 kVA diesel power generator to the pumps. Connected by air tubing to said air pumps is an equipment of the invention having a capacity of 2400 L/min of air/oxygen dissolution in the water of the tank. It is known that there is a substantial decrease in the concentration of oxygen dissolved at night. The equipment of the invention, operating at its maximum dissolution capacity of 2400 L/min of air, provides dissolution of 23.2 g of $O_2$/min, or 33.4 kg of $O_2$ per day. In a volume of 12,500 m$^3$, it means the equivalent of dissolving 2.7 mg of $O_2$/L of water throughout the tank per day. The equipment of the invention is configured to operate with the most available energy during the cycle. During the day, it takes advantage of solar and/or wind energy; at night, wind energy; and at any time the generator power to the extent that solar or wind energy is not available. Operating only with diesel generator, the equivalent in external power supply is approximately 0.75 kW/h. Such demand may be wholly supplied by solar panels and/or wind turbines while the sun is available or there is an incidence of winds.

The forced aeration conditions evaluated, in the worst case scenario, provided 10% increase in the productivity of fish grown in tanks, 5% improvement in feed conversion (it is known from the literature that fish grown in waters with more amount of oxygen dissolved have better feed conversion, i.e. require less feed to gain weight) and a 10% reduction in growth cycle time, i.e. the time for the fish to reach the desired weight.

Introduction of air ($O_2$) greatly changes the characteristics of the liquid body: It disappears the bad smell; improves fish culture conditions; increases feed conversion (i.e., decreases the amount of aeration required for fattening the fish); it makes possible the intensive production of fish, that is, the increase of the density of fish by tank areas, due to the great availability of air in the liquid and the better quality of the water. In addition, the gas stripping constantly renews the dissolved air, avoiding toxicity.

Example 7. Process for the Conservation or Improvement of Water Quality in a River (Rio Arroio Fundo, Rio de Janeiro)

Severe water crisis mentioned in this report is not only related to the availability of water in quantity, but also in quality. Water sources whose use are not currently considered such as wastewater or polluted river waters can be at least partially treated in the riverbed by intensive aeration with the equipment of the invention. In this embodiment, the equipment of the invention is used in conjunction with other equipments known in the prior art. Referring to Rio Arroio Fundo, in Rio de Janeiro, the demand for the treatment of its waters is very large, due to the enormous amount of wastes (essentially domestic sewage from surrounding communities). In said river, an arrangement in which commercially available turbines (Toring Turbine) are installed prior to the river treatment plant, each providing the introduction of 10 L/s of air into the liquid body in the form of micro bubbles at an energy cost of 2 HP. The introduction of the micro bubbles helps to decrease the BOD of the river; it also assists in the flotation processes currently used. After the river treatment plant, the equipments of the present invention according to FIGS. 3A through 3D, FIG. 4, or FIG. 17 complement the aeration of the riverbed, reducing odor. Depending on the number of turbines and equipment of the invention installed in the river, most or even all of the BOD can be supplied (through the massive dilution of oxygen from the air, at low energy cost).

Figure 27A:
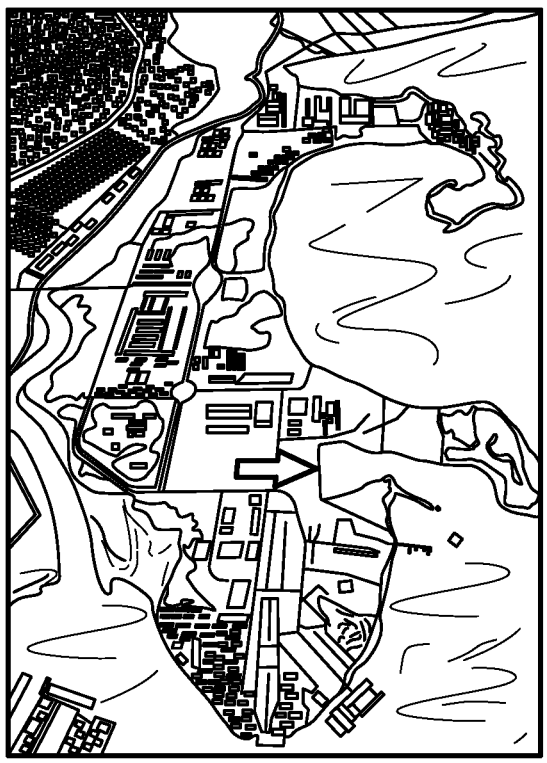
FIGS. 27A and 27B show a schematic representation of a process embodiment of the invention, in which the equipment and process for recovery/revitalization of the Enseada do Bom Jesus, on Ilha do Fundão, is depicted. Shown in FIG. 27A a photo of Ilha do Fundão, the arrow indicating the location of the Enseada do Bom Jesus.
Figure 27B:
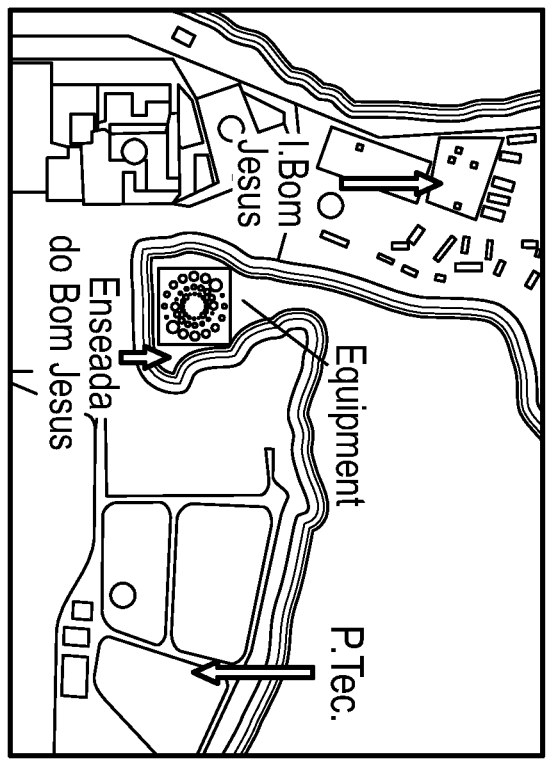
Figure 28:
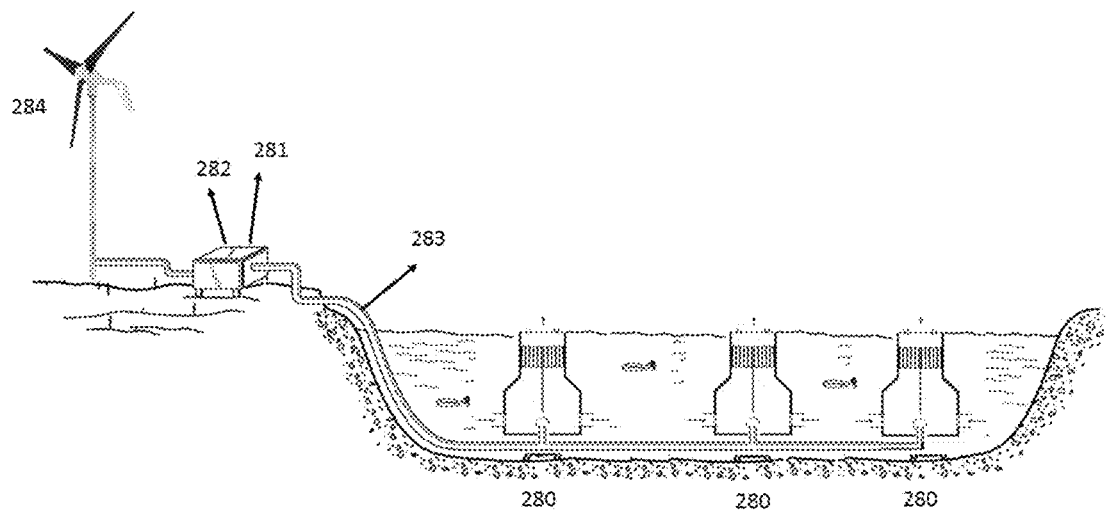
FIG. 28 shows a schematic (without scale ratio) representation of an embodiment of the invention, in which the equipment and process of the invention are used for increasing the dissolved oxygen level and the water quality of a pond, river or aquaculture tank. There are shown: three equipment units of the invention (280), each with an aeration capacity of 2400 L of water per minute, placed in the liquid body; the schematic representation of an air pump (281) having an air insufflation capacity of 7200 L of air per minute, optionally including a pump drive/adjusting controller (282) for moments of aeration demand in the liquid body; the air tubing (283) connecting the air pump (281) to the equipment (280) for massive dilution of air in the liquid; and an energy generating wind turbine (284).

Example 8. Equipment and Process for the Recovery of the Enseada do Bom Jesus, at Ilha do Fundão With the severe water crisis that plagues the country and several other regions of the world, the need to develop technologies for the conservation of water resources and/or the recovery of degraded areas became even more evident. In the present example, solutions are provided for the recovery, revitalization and conservation of a small cove on the Ilha Fundão, next to the Technological Park, in the area indicated in FIGS. 27A and 27B, which is between the old Ilha Bom Jesus and the former Ilha Sapucaia.

Ilha do Fundão, which houses the University City, with UFRJ, the Petrobrás Research Center, and the Technological Park, has 523 hectares (more than 5 million square meters) and has 508 households (2010) (at Vila Residencial—Bairro Cidade Universitária) is rimmed on the one side by Cunha Channel and on the other side by Baia of Guanabara (latitude 22°51'27.24"S and longitude 43ten°13'49.38"W). Although in a potentially bucolic environment, its beaches and coves are heavily polluted by floating material (bottles, plastic etc.), sewage and accumulated sludge. The bad smell around the Island is remarkable, being noticeable not only in the Fundão Channel and the Cunha Channel, where thousands of people a day pass, but also in most of the Ilha Fundão.

Some characteristics of the contaminants sources and the sediment flow are important in understanding the environmental problems of the Ilha do Fundão. As for sediment transport, sediment inflow from the external area of the bay to the central portion of the eastern region was verified in the eastern and southern regions. In the Fundão Channel, the residual transport indicated sediment exit, with longitudinal transportation to the island, while in the North region, it was observed that the residual transport occurs from Ilha do Governador towards Ilha do Fundão. The environmental analysis of the Fundão Channel reveals that organic matter reaches values above 25%. The environmental analysis of the Fundão Channel reveals that organic matter contents reach values above 25%. The eastern and southern regions present contents around 20%, while in the North the values were around 4%, evidencing a possible correlation of higher organic matter contents in regions with fine sediments (Mendonça, Raphaela de Paiva e Ribeiro, Vivian Almeida Faxas, 2014). The regions of the Fundão Channel and the Cunha Channel are much silted, with a maximum depth of 0.5 m in many places. Although dredging (in 2007-2010) initially minimized the problems, the channel quickly returned to the initial situation as no further measures were put in place to improve the situation.

The volume of approximately 30,000 m³ of water, the renewal of up to 100% of its volume daily, due to the tides (two occurrences of tide a day, with an average amplitude of 0.5 m each), and the average BOD in the area adjacent to the Enseada do Bom Jesus (10 to 50 mg/L, data INEA, 2014), establish the parameters for calculating the operating regime of the process of the invention, so that it effectively reduces the organic load. The process of this embodiment of the invention provides, as it should, at least the dissolution of more oxygen in the water than the oxygen demand that arrives each day in the Enseada, in the form of organic load coming from the tide (since there is no another dumping point on the Enseada). With the operation of the equipment of the invention in the Enseada, this gradually becomes to dilute the organic load in its surroundings, so that after some time of operation the vicinity of the Enseada also benefits from the effect of oxygenation, providing the revitalization and restoration of aerobic ecosystems in your environment.

This embodiment of the process of the invention has been developed for the environmental recovery of said liquid body and makes use of 20 equipments of the invention as shown in FIGS. 9A and 9B, with full saturation capacity with oxygen in 1200 L of water per minute, each connected to a 0.5 HP air pump (SNatural, model CV-51M) with the capacity to inflate 1200 L/min of air. Alternatively, 10 equipments of the invention with full saturation capacity with oxygen are used in 2400 L of water per minute, each connected to two 0.5 HP air pumps (SNatural, model CV-51M) capable of insufflate 1200 L/min of air each are used. The pumps/blowers are connected to a 15 kVA diesel generator. Optionally, the power supply is aided by sixteen solar panels Model Yingli 250, with capacity of 250 W each; and by four energy generation wind turbines, model Enersud Gerar 246, with capacity of 1 kW each.

Operating 24 hours per day, the equipments of this embodiment of the invention provide the dissolution of 334 kg $O_2$/day, the equivalent supply of the daily removal of 334 kg of BOD. Considering an average BOD of 10 mg/L in the waters that reach Enseada do Bom Jesus, in this operation regime, the amount of oxygen returned to the said Enseada is equivalent to treating approximately 33,400 m³ of water (with BOD 10) per day. In other words, under these conditions the process of the invention provides for the supply of all the biochemical oxygen demand (BOD) of the entire volume entering the said cove daily, still leaving the additional oxygen supply capacity sufficient for the removal of 34 kg of BOD per day (said Ensenada has approximately 30,000 m³ of total volume. Considering the tide, it is possible that even an equal volume of water enters and leaves the Enseada every day). Under these conditions, the process of this embodiment of the invention therefore provides for the removal of 1 ton of BOD from the Enseada every 30 days. With the gradual reduction of the BOD of the Enseada waters, the volumetric recovery capacity increases proportionally, until the entire volume of the Enseada is completely recovered. All this with an approximate external energy consumption of 7.5 kW/day (without the use of solar panels or wind turbines).

It will be appreciated that the technology of the invention provides for the adjustment of the dissolution of gases in the liquid proportionally to the demand of oxygen in the place and/or desired time of recovery—the same being valid for larger areas or larger BODs.

Alternatively, an equipment of the invention is utilized according to FIG. 17, having four stages, comprising hives 52.5 cm wide, 7 cm deep and 200 cm long (or two hives each having a half dimension one) and the rigid body having a conical trunk shape, 200 cm long, 100 cm high and 150 cm wide at the base. Said equipment embodiment has full aeration capacity, or full saturation of water with oxygen from the air, of 1 m³/s of water. Thus, the energy demand is of the order of 10 HP or 7.5 kW when one or more blowers are used driven by external electric energy. This configuration provides the dissolution of 38.6 g of $O_2$/s, 138.9 kg of $O_2$/h, or 3.33 ton of $O_2$/day. Considering alternatively an average BOD of 50 mg/L in the waters that reach Enseada do Bom Jesus, in this operation regime the amount of oxygen returned to said Enseada is equivalent to the treatment of approximately 66,800 m³ of water (with BOD 50) per day. In other words, under these conditions the process of the invention provides for the supply of all the biochemical oxygen demand (BOD) of the entire volume entering the said bay daily, still leaving sufficient additional oxygen supply capacity for the removal of 1.8 ton of BOD per day (said Ensenada has approximately 30,000 m³ of total volume. Considering the tide, it is possible that even an equal volume of water enters and leaves the Enseada every day). Under these conditions, the process of this embodiment of the invention therefore provides for the removal of 1.8 tonnes of BOD from the Enseada per day. With the rapid reduction of the BOD of the Enseada waters, the volumetric recovery capacity increases proportionally, until the entire volume of the Enseada is completely recovered. All this at an external energy consumption of approximately 10 HP or 7.5 kW (without the use of solar panels or wind turbines). In this embodiment, since the oxygen dissolving capacity is substantially greater than the oxygen demand related to the organic load entering said Enseada, within a few days after the complete recovery of the aerobic conditions at the Enseada, it becomes an aerated water plume in its surroundings, radiating the aerobic zone to the nearby areas around the Ilha do Fundão. This approach, due to the low magnitude of energy demanded, makes the bathing of this and other similar regions viable.

Accordingly, those skilled in the art will know from the teachings presented herein that the technology of the present invention not only promotes the efficiency and competitiveness of companies operating in the environmental sanitation segment but also the revitalization of areas where economic activity is partially or completely stagnant due to environmental degradation. The use of the equipment and process of the invention adapted to each situation requiring aeration/oxygenation at different scales provides for the recovery of liquid bodies such as the depollution of parts of Baía de Guanabara Bay (and other bodies such as ponds, lakes in parks etc). Said liquid bodies are largely favored by the equipment or process of the invention, which provides a healthy and aerobic environment with low energy consumption.

The present example also contributes to the parametric study and the demonstration of proof of principle in bodies of water of greater volume. The technologies described here are equally applicable to the situation in salt water (coastal region and lagoons, crustacean breeding) and freshwater (lakes, breeding freshwater fish, wastewater).

Example 9. Equipment and Process for the Recovery of the da Lagoa Rodrigo de Freitas, Rio de Janeiro Lagoa Rodrigo de Freitas has a volume of approximately 5 million m³ of water, substantial water reception from the basins of its surroundings and also has communication with the sea, there are moments due to the tides and/or control of the Jardim de Alah channel, where there is inflow of seawater or outlet through said channel.

Lagoa Rodrigo de Freitas is known for its episodes of fish mortality, which impacts the life of the fishermen of the region, the residents of the surroundings and the tourist potential, and leisure and sports. This phenomenon has been the object of several studies and projects to solve this and other problems related to the contamination of its waters. The organic load that arrives at the Lagoa due to clandestine evictions or situations of heavy rains is not completely mobilized by the organisms that live there, resulting in the stratification of its waters. While on the surface the aeration due to the winds is substantial, in deeper zones the amount of dissolved oxygen drops drastically, being several zones containing mud with organic matter in essentially anaerobic regime. Depending on weather conditions, rainfall regimes, winds and dumps, the situation may be critical or close to critical. Among several reasons, one in particular contributes to this situation: the incompatibility between the amount of organic load arriving at the lagoon and its capacity to mobilize it, due to the low availability of dissolved oxygen, especially in the deeper zones.

This embodiment of the process of the invention has been developed for the environmental recovery of a region of said liquid body and makes use of 2 equipments of the invention as shown in FIGS. 9A and 9B and FIGS. 14A and 14B, with full saturation capacity with oxygen at 1200 L of water per minute, each connected to a 0.5 HP air pump (SNatural, model CV-51M) with capacity to inflate 1200 L/min of air. The air pumps/blowers are connected to the power grid surrounding the Lagoa. Optionally, the power supply of each pump is aided by four solar panels model Yingli 250 with capacity of 250 W each, which feed a battery during the day, being discharged overnight to boost the air pump; or by a small wind turbine of energy generation, model Enersud Gerar 246, with capacity of 1 kW.

Operating only for 8 hours at night (from 10 pm to 6 am), which is the most critical moment of the dissolved oxygen concentration ($O_2$ not produced by algae at night), the equipments of this embodiment of the invention provide the dissolution of 11.1 kg $O_2$/night, the equivalent supply of the daily removal of 11.1 kg of BOD at an energy cost of 1 HP or 0.75 kW.

As illustrated in FIG. 18, the equipment of the invention provides for the displacement of liquid from the bottom of the pond and its complete aeration, with the aerated liquid being returned to the bottom, i.e. precisely the most critical region and with difficulty of natural aeration, where in addition the sediments are deposited, that are have little capacity of mobilization due to the little aerated environment.

In this embodiment, the equipment of the invention provides for changing the direction of the liquid flow, so that the operator chooses which side to form a liquid stream and at what time. This additional technical feature of the equipment of the invention provides a liquid flow reversal process which is particularly useful in aerating this liquid body which is subject to the tide, the influence of localized organic load inlets, as well as to facilitate the unclogging of equipment or parts of it with plastics and other solid materials that eventually come into contact with the equipment, i.e. the equipment is "self-cleaning", providing substantial advantages of process control.

Figure 19:
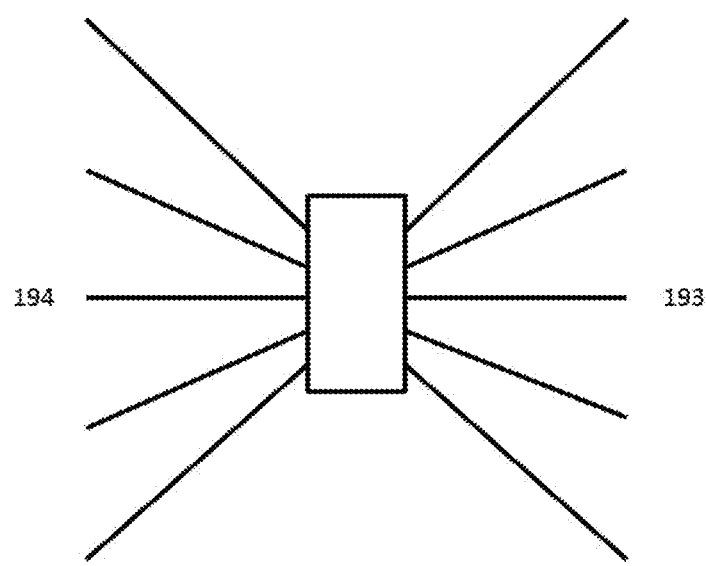
FIG. 19 shows a schematic representation of a process embodiment of the invention, in which there is a top view of equipment according to FIG. 4, but with a full aeration (saturation) capacity of 1000 liters per minute of water, disposed in a water tank. The equipment of this embodiment includes 5 water inlet pipes (193) and 5 water outlet pipes (194), each tube carrying or receiving 200 liters of water per minute. In embodiments where the equipment of the invention provides for changing the direction of the liquid flow, the operator chooses which side to form a liquid stream and at what time. This additional technical feature of the equipment of the invention provides processes in which the flow inversion is useful step in the process, such as the case of aeration of liquid bodies subject to the tide and/or influence of localized organic load entries, as well as to facilitate unblocking of equipment or parts thereof with plastics and other solid materials that eventually come into contact with the equipment, in which case the equipment is "self-cleaning", providing substantial advantages of process control.

In addition, as shown in FIG. 19, each unit of equipment of the invention, when equipped with 5 inlet and 5 outlet liquid tubes, provides a large area of influence or formation of aerated water feeds according to tube arrangement. Using tubes of 50 m each in a 1000 L/min flow equipment, 200 L/min pass through each tube, propagating an area of influence of a radius of up to 200 m in the environment. This recovery is particularly useful for the revitalization of the area and to benefit sporting practices in its surroundings.

An equipment with this configuration, installed next to Namoradeira da Lagoa, operates submerged, without visual impairment, being operated preferably at night, providing maintenance of a region with a higher concentration of dissolved oxygen in its surroundings. This is made possible by both the dissolving capacity of oxygen in the water and the adjustment of the direction of liquid flow in the tubes, made according to the flow of water (influenced by the winds and/or flow conditions in the Jardim de Alah channel).

This approach, given the low magnitude of energy demanded, makes it feasible in practice to bathing specific areas of the Lagoa or the entire Lagoa, depending on the quantity, specification of the equipments and their location.

Figure 23:
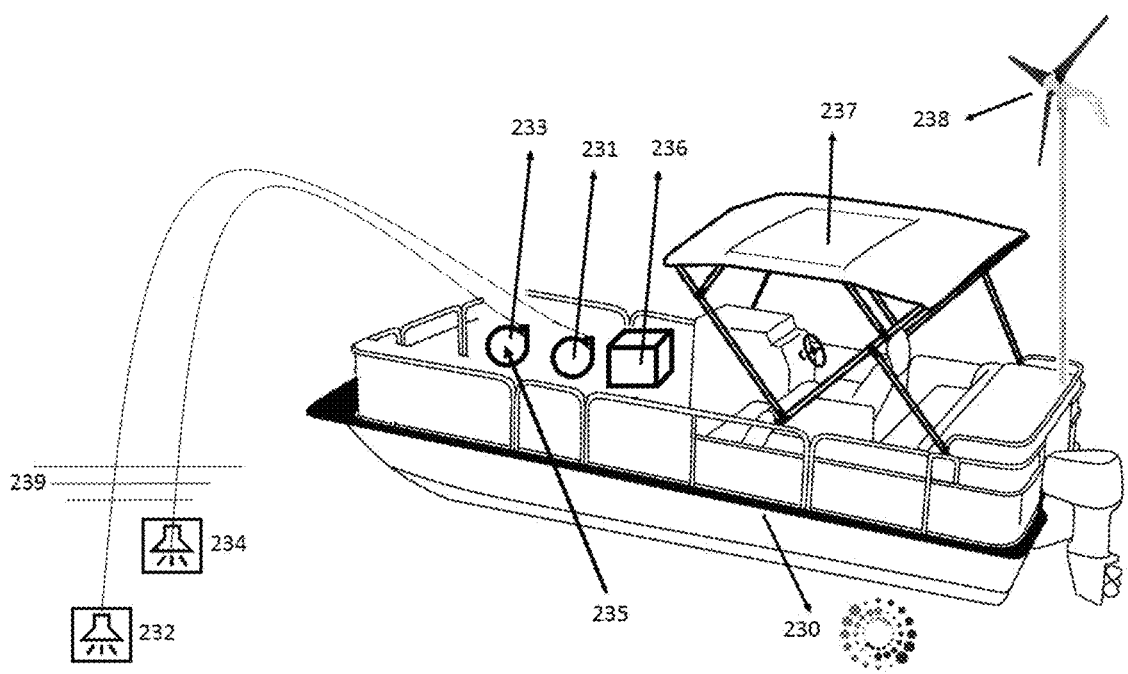
FIG. 23 shows a schematic representation of an equipment embodiment of the invention, consisting of a floating unit (230), also represented by the symbol , comprising: an air pump (231) connected by piping to one or more thin liquid film forming devices (232); a water pump (233) connected by piping to one or more micro bubble forming and/or thin liquid films devices (234), said devices (234) having an air intake close to the surface of the liquid, the liquid inlet tubing (235) in the pump (233) is also indicated; a pump drive controller (236), optionally connected to a diesel generator of electricity; a solar panel (237) connected to the controller (236) and/or the pumps (231, 233); an energy generating wind turbine (238) connected to the controller (236) and/or the pumps (231, 233); and a schematic representation of the waterline (239).

Example 10. Process of Treatment of Liquid Body Including the Selection of Microorganisms of Own Medium, Enrichment of Them and Return to the Liquid Body One embodiment of the invention is specifically directed to solving a regulatory problem, which often makes it impossible to treat water courses, such as lakes, ponds, rivers, canals, river or sea arms, bays, etc. The difficulty of prohibiting the introduction of exogenous microorganisms into such bodies by their possible and/or unknown environmental impact is solved by the use of the equipment of the invention next to such bodies of water. With reference to FIG. 23, it will be understood that one embodiment of the equipment of the invention consists of a floating unit (230), also represented by the symbol , comprising: an air pump (231) connected by tube to one or more thin liquid film forming devices (232); a water pump (233) connected by tubing to one or more micro bubble and/or thin liquid films forming devices (234), said devices (234) having air together with the liquid surface, the liquid inlet tube (235) in the pump (233) is indicated; a pump drive controller (236), optionally connected to a diesel generator of electricity; a solar panel (237) connected to the controller (236) and/or the pumps (231, 233); an energy generating wind turbine (238) connected to the controller (236) and/or the pumps (231, 233); and a schematic representation of the water line (239).

Figure 24:
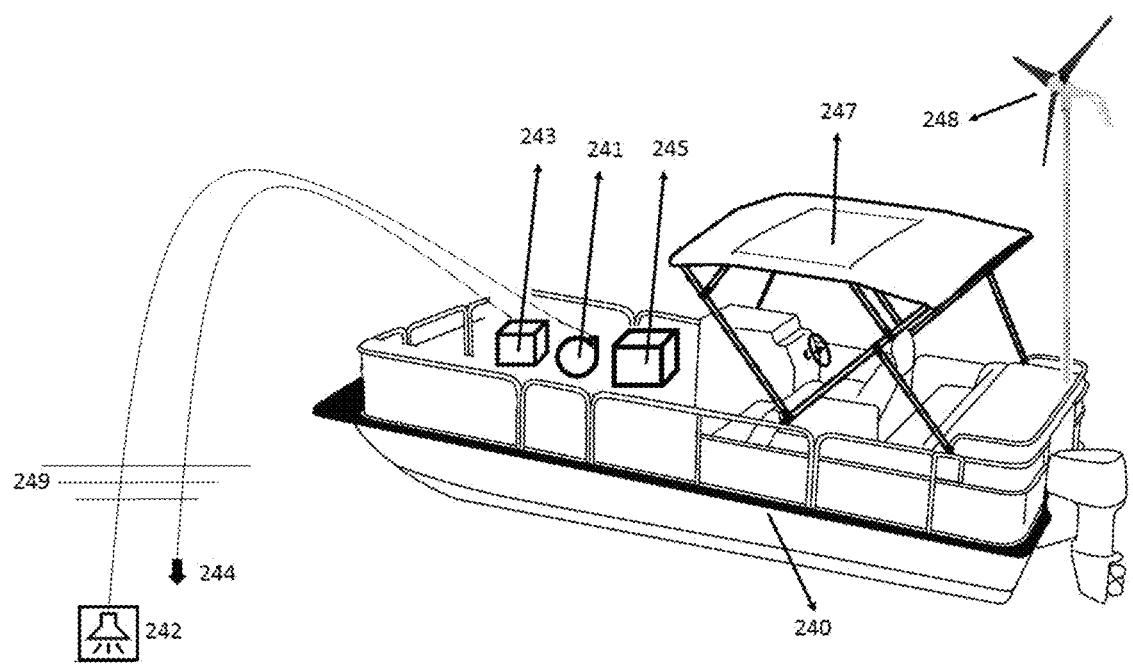
FIG. 24 shows a schematic representation of one equipment embodiment of the invention, consisting of another floating unit (240) comprising: an air pump (241) connected by piping to one or more thin liquid film forming devices (242); an ex-situ micro-organism enriching subsystem (243), for substantially increasing the amount of microorganisms previously present in the liquid body and reintroducing it (244), thereby reducing the amount of energy required for aeration in the liquid body required for the growth of microorganisms (ex-situ growth saves energy and provides more substantial growth); a pump drive controller (245), optionally connected to a diesel generator of electricity; a solar panel (247) connected to the controller 245 and/or to the pump (241) or ex-situ enrichment subsystem (243); an energy generating wind turbine (248) connected to the controller (245) and/or to the pump (241) or ex-situ enrichment subsystem (243); and a schematic representation of the water line (249).

FIG. 24 shows a schematic representation of one embodiment of the equipment of the invention, consisting of another flotation unit (240) comprising: an air pump (241) connected by tubing to one or more thin liquid film forming devices (242); an ex-situ subsystem (243) for enriching microorganisms, for substantially increasing the amount of microorganisms previously present in the liquid body and reintroducing its (244), thereby reducing the amount of energy required for aeration in the liquid body required for the growth of microorganisms (ex-situ growth saves energy and provides more substantial growth); a pump drive controller (245), optionally connected to a diesel generator of electricity; a solar panel (247) connected to the controller (245) and/or to the pump (241) or ex-situ enrichment subsystem (243); an energy generating wind turbine (248) connected to the controller (245) and/or to the pump (241) or ex-situ enrichment subsystem (243); and a schematic representation of the water line (249).

Figure 25:
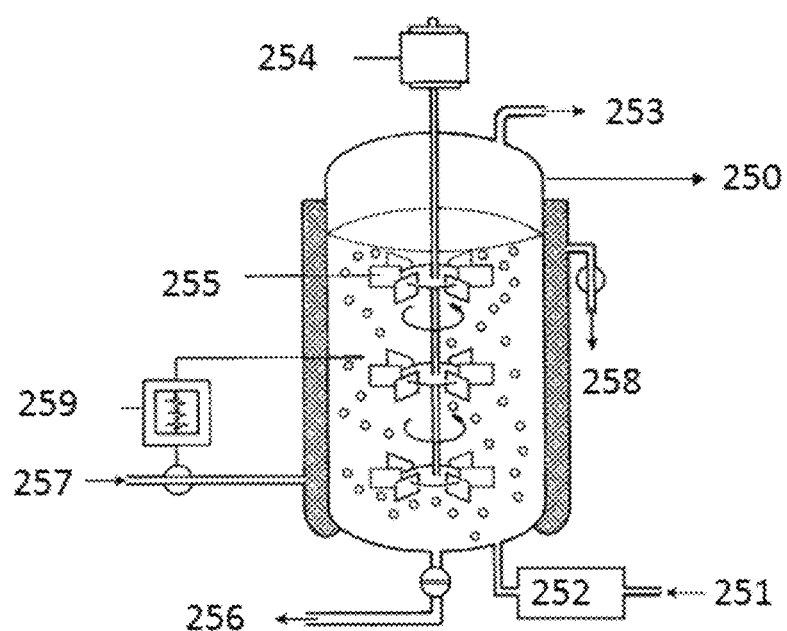
FIG. 25 shows a schematic representation of the microbial culture enrichment ex-situ subsystem (250) shown in FIG. 23 or FIG. 24 for subsequent or concomitant introduction of the microorganisms cultured therein into the liquid body. The following are indicated: reactor (250) for ex-situ microorganisms enrichment; air inlet (251) in the reactor; air filter (252), optionally also including an air micro bubble generating device; gas outlet (253) of the reactor; stirrer motor (254); stirring blades (255); outlet (256) of the fermented wort in the reactor, rich in microorganisms; fluid inlet (257) for controlling the temperature in the reactor jacket; fluid outlet (258) of temperature control in the reactor jacket; and a probe (259) indicating physico-chemical parameters in the reactor, optionally being connected to the fluid input control of temperature control and/or to another control element of the reactor.
Figure 26:
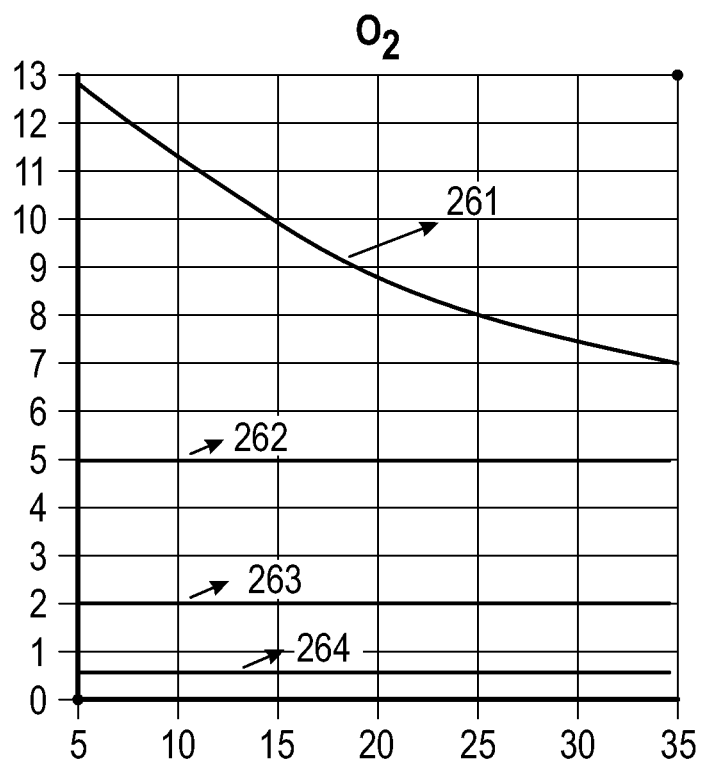
FIG. 26 shows a graph showing the oxygen saturation curve in water (without salinity) according to temperature, also indicating the minimum limits of oxygen in the liquid body and respective associated phenomena. The ordinates indicate the concentration values of dissolved oxygen in water, in mg/L (or ppm); in the abscissae are indicated the temperatures in degrees Celsius. (261) indicates the saturation curve or maximum dissolution of oxygen in water at different temperatures; (262) indicates the minimum dissolved oxygen concentration recommended for fish culture; (263) indicates the minimum dissolved oxygen concentration recommended for water treatment; (264) indicates the concentration of dissolved oxygen below which the formation of unpleasant odors in the liquid body occurs.

Described in more detail in FIG. 25 is the ex-situ enrichment subsystem, for subsequent or concomitant introduction of the microorganisms cultured therein into the liquid body. The following are indicated: reactor (250) for ex-situ enrichment of microorganisms; air inlet (251) in the reactor; air filter (252), optionally also including an air micro bubble generating device; gas outlet (253) of the reactor; stirring motor (254); stirring blades (255); outlet (256) of the fermented wort in the reactor, rich in microorganisms; fluid inlet (257) for controlling the temperature in the reactor jacket; fluid outlet (258) of temperature control in the reactor jacket; and a probe (259) indicating physico-chemical parameters in the reactor, optionally being connected to the control inlet of temperature control fluid and/or to another control element of the reactor.

Under conventional conditions in the liquid body, the concentration of the microorganism of interest is some orders of magnitude lower than that obtained in the reactor (250), which provides the enrichment at least 1000 times the concentration of the microorganism of interest. In these conditions, the control of the microbial population in the liquid body is done by adding the content of the ex-situ culture in a ratio of 1/1000 (or even lower, depending on the reactor operating conditions). It is important to enhance that this is not the only advantage of the present invention: obtaining high titers of microorganisms outside the liquid body and their subsequent reintroduction, in high quantity and high state of metabolic activation, potentiates the efficiency of the bioremediation process for the reasons already indicated in this report. Subsequently, the amount of energy required to introduce gases into such a smaller volume is also substantially lower. Thus, obtaining high concentrations of microorganisms in the ex-situ subsystem of the equipment of the invention is enabled with substantial reduction of energy, especially when compared to the energy required for the introduction of gases (and similar concentration of microorganisms) throughout the liquid body.

Example 11. Equipment and Process for Improving the Water Quality from Effluent Treatment Plants In this embodiment, there is described an equipment and process for improving the water quality from effluent treatment plants. In the present example, the complete saturation of the outlet water from an effluent treatment plant is described, in order to reduce the environmental impact in the area where the liquid is discarded and/or to enable or improve the conditions of reuse of said water.

Taking as an example the Station of the Treatment of Effluents of Alegria, Rio de Janeiro, one has that the current flow is of 1.5 to 2.5 $m^3$/s. As the organic matter content is 0.2%, it can be considered that the volume of liquid entering is equal to the leaving volume (neglecting evaporations). Since practically no effluent treatment plant in this slave removes all of the organic matter, one can use the premise that the water leaving the station has a low concentration of dissolved oxygen.

The process of this embodiment of the invention provides the complete saturation of the water with oxygen, so that the water obtained after said process is saturated, rich in oxygen, benefiting the Baía de Guanabara region where it is currently cleared. Alternatively, it also makes possible its reuse. This embodiment of the process of the invention makes use of two equipments of the invention according to FIG. 17, with four stages, comprising hives 52.5 cm wide, 7 cm deep and 200 cm long (or two hives with half dimension each) and the rigid body having a conical trunk shape, 200 cm long, 100 cm high and 150 cm wide at the base. Said equipment realization has complete aeration capacity, or complete saturation of water with the oxygen of the air, of 1 $m^3$/s of water in each equipment.

Thus, the total energy demand is of the order of 20 HP or 15 kW when one or more blowers are used to drive the external electric energy. This configuration provides the dissolution of 77.2 g of $O_2$/s, or 6.67 ton of $O_2$/day. Alternatively, the equipments of this embodiment of the invention takes advantage of the energy of the flow and water gap available in the exit zone of said station. Specifically, the dip and/or flow of water is conveniently used as the driving force for the suction or injection of gases into the equipments of the invention from the Venturi effect known to those skilled in the art. Thus, in this embodiment of the equipment of the invention said conventional gas bubble forming device in the lower region of the equipment is not a perforated tube connected to an air blowing pump but the end of a Venturi tube configured to suck air from the atmosphere, taking advantage of the energy of the water flow and/or the water level gap available on site.

In this embodiment, as the oxygen dissolving capacity is very large, in a few days the water will form a plume of aerated water in its surroundings, radiating the aerobic zone to the nearby areas around the Station, potentially positively influencing the community that inhabits the Ilha do Fundão. This approach, due to the low magnitude of energy demanded, makes the bathing of this and other similar regions viable.

Subsequently, those skilled in the art will know, from the teachings presented herein, that the technology of the present invention not only promotes the efficiency and competitiveness of companies operating in the environmental sanitation segment, but also the revitalization of areas whose economic activity is partially or completely stagnant due to environmental degradation. The use of the equipment and process of the invention, adapted to each situation requiring aeration/oxygenation, at different scales, contributes to the recovery of liquid bodies and the depollution of parts of Baía de Guanabara. Said liquid bodies are largely favored by the equipment or process of the invention, which provides healthy and aerobic environment with low energy consumption.

The present example also contributes as proof of concept in an effluent treatment plant, and the same principle can subsequently be used in the treatment of the effluent itself, which requires a high amount of aeration and is currently a considerable energy demand. Estimates taken from the consideration of the total organic load (BOD vs. volume) indicate that the technology of the present invention provides a substantial reduction of energy consumption for the dissolution of oxygen in this and other effluent treatment plants, in which the demand for energy for aeration corresponds to approximately 50% of all the station's energy demand.

Example 12. Saving Time and/or Energy in the Recovery of Degraded Areas

A degraded area recovery system provided with an equipment according to the present invention is particularly useful for energy efficient operation. In addition to reducing the amount of energy required for the same level of treatment, said equipment and process provide reduction of the time required for bioremediation or removal of organic load.

In addition, the equipment and process of the invention are adjustable to the availability of energy, synchronously or anti-synchronously to the cycles of energy availability in the electrical system that supplies them. In this context, since the average organic load degradation time with the use of the equipment of the invention is much shorter than the corresponding time in conventional systems, the process of the invention provides greater flexibility in adjusting the operation according to the operating time cycle of energy demand in the electrical system where the system is connected—since the means to adjust the amount of energy introduced in the system play a substantial change in the costs or energy risks of operation of both the bioremediation equipments and the electrical system in which they are connected.

The application of the inventive concept of the present invention further provides, therefore, adjustment of the energy use in the equipment of the invention so that the moments of greater energy consumption of the equipment occur in moments of greater availability or lower cost of energy offered by the operator of the bioremediation process. From the point of view of the system operator, the invention is particularly useful for decreasing the amount of energy consumed, which can be increased at times of peak demand, increasing safety and reducing the risks of failures in the electrical system.

The use of the invention also provides for the reduction of energy consumption at peak times, because the equipment of the invention may have reduced energy consumption at such times to a minimum which does not compromise the organic load withdrawal threshold attainable by conventional systems. These technical effects of the invention are highly relevant and difficult to obtain by conventional systems, bringing substantial advantages: from the operator's point of view of the electrical system, the use of the invention increases the efficiency of the electrical system as a whole, notably in electrical systems based on hydroelectric plants, in which the energy produced is not stored, at least not properly or substantially. The invention therefore contributes to reducing energy consumption.

In addition, it also provides for the time-selective reduction of the impact of its energy consumption on electrical systems, which can thus be operated with less demand variation at critical times—as is the case with typical demand peaks that are the criterion for sizing energy systems to be lower than that observed without the use of the invention.

Example 13. Equipment and Process for the Conservation or Improvement of Water Quality in a River or Lagoon Using Alternative Energy The severe water crisis mentioned in this report is not only related to the availability of water in quantity, but also in quality. Water sources whose use is not currently considered such as wastewater or polluted river waters may be at least partially treated in the riverbed by oxygenation with the equipment of the invention.

In this embodiment, illustrated in FIG. 29, the equipment and process of the invention are used to increase the dissolved oxygen level and water quality of a river or pond alongside a highway or avenue. There are shown: three equipment units of the invention (290), each with aeration capacity of 2400 L of water per minute, placed in the liquid body; the schematic representation of an air pump or air compressor (291) with air blowing capacity of 7200 L of air per minute, optionally including a drive/pump adjusting/compressor controller (292) for moments of aeration demand in the liquid body; the air tubing (293) connecting the air pump/compressor (291) to the equipments (290) for massive dilution of air in the liquid; and an electric power generating spine (294) for feeding the pump (291). The spine (294) optionally is a pneumatic spine which feeds the compressor (291) directly with air.

The equipment of this embodiment of the invention has air dissolution ability proportional to the amount of vehicles passing through the spine at each period. Each set of equipments of this embodiment of the invention provides the dissolution of 100 kg of $O_2$ per day, without external power source power consumption. This amount of oxygen provides the equivalent of removing 100 kg of BOD per day from the water per set. For each river, considering the flow rate and BOD released per day on the river, the number of sets of equipment of this embodiment of the invention is calculated at each runway (distance) stretch to provide for return of dissolved oxygen in the liquid body according to the desired parameter.

In this context, it should be noted that the solution provided herein is energy-efficient and practically does not imply operational costs (except for preventive and/or corrective maintenance). In addition, the capacity of the equipment of the invention increases proportionally to the increase in the flow of vehicles, which demonstrates that the inventive solution is not only sustainable at present but tends to remain sustainable over time: the greater the flow of vehicles, the more capacity of oxygenation of the liquid body provides the equipment of the invention.

Those skilled in the art will know from the teachings of this embodiment of the invention that different configurations of the equipment (air blowing capacity) or different flows of vehicles can substantially alter the proportions/capacities now exemplified.

Figure 30A:
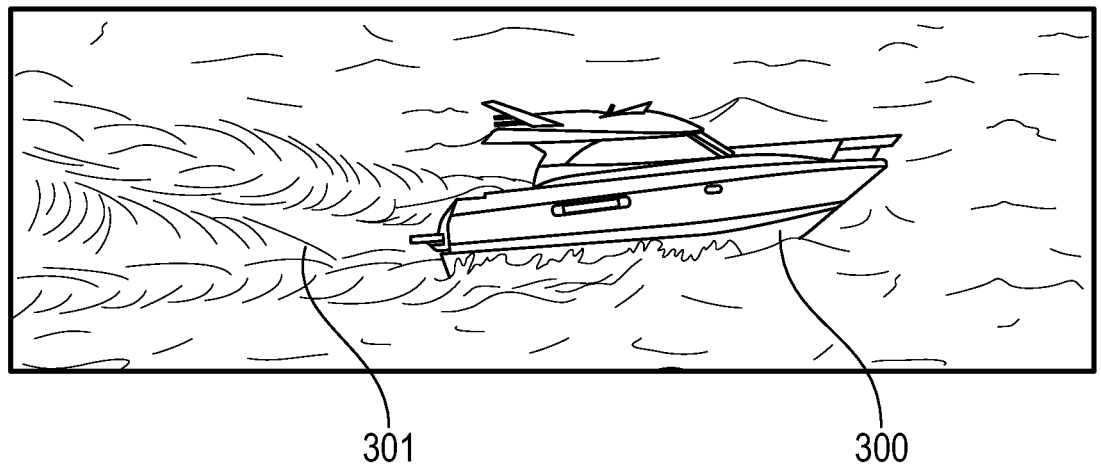
FIGS. 30A and 30B show a schematic representation of another embodiment of the invention in which the power of the boat propulsion engine is utilized for the generation of micro bubbles and/or thin liquid films, thereby dispensing with the use of other pumps or other sources of energy. This embodiment of the invention enables, in practice, the conversion of boats and ships into oxygen return units to the liquid bodies through which they sail. The following are indicated.
Figure 30B:
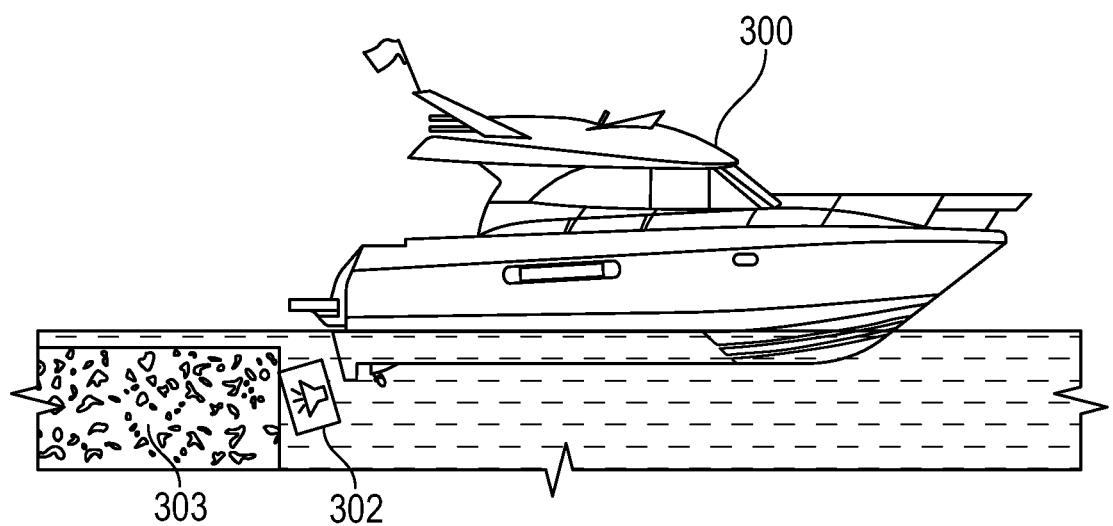

Example 14. Boat Equipped with Aeration System for the Use of Energy for the Conservation of Waters Where it Navigates FIGS. 30A and 30B show a schematic representation of another embodiment of the invention in which the power of the boat propulsion engine is utilized for the generation of micro bubbles and/or thin liquid films, thereby dispensing with the use of other pumps or other sources of energy. This embodiment of the invention enables, in practice, the conversion of boats and ships into oxygen return units to the liquid bodies through which they sail. The following are indicated: in FIG. 30A a boat (300) with center engine and (301) the hydrodynamic flow generated in the rear region of the boat, that is, after the propulsion effect. In FIG. 30B there is shown a schematic representation of this embodiment of the invention, in which a center motor boat (300) comprises a micro bubble and/or liquid thin film generating device (302) fixed in a region posterior to the boat propeller, in order to take advantage of the hydrodynamic flow generated by the movement of the boat. Movement of the liquid within the device causes suction, with a vent above the surface of the liquid where the air enters the device (302) causing micro bubbles and/or thin films of liquid to form in the water (303), aerating.

Example 15. Massive Dissolution of $CO_2$ Generated in Industrial Plants

The equipment and process of the invention is also suitable for use for the dissolution of $CO_2$ generated in industrial plants, for example in cement plants. It is estimated that in addition to consuming around 2% of all global energy, cement plants are also responsible for 5% of $CO_2$ emissions worldwide. The production of one ton of cement generates between 600 kg and 1 ton of $CO_2$, and sulfur oxide, nitrogen-containing gases and carbon monoxide, all of which are polluting, are produced. The equipment of the invention is also useful for the dissolution of such gases into liquids. In this embodiment, part of the carbon dioxide containing gases from the cement factory is dissolved in water in an algae culture tank, which uses $CO_2$ for its growth and produces oxygen, thereby reducing the environmental impact of the cement plant. The algae fix the dissolved $CO_2$ and use it for the production of substances of economic interest. In this context, it is important to note that at room temperature the $CO_2$ is 26 times more soluble in water than $O_2$, notably in increased content or partial pressure as is the frequent case of factories.

By using equipment such as that illustrated in Example 1, capable of exchanging gases in 1200 L of water per minute (with 1200 liters of gas per minute), saturating said volume of water with the present $CO_2$ in said gas, 250 g of $CO_2$ are dissolved per minute in the water.

By using a fourth stage equipment as shown in FIG. 17, with gas exchange capacity in 1 $m^3$/s of water per minute (with 4 $m^3$ of gases per second), said volume of water is saturated with the $CO_2$ present in the gas, so that it has been found that 86.5 tons of $CO_2$ are dissolved per day in the water.

These embodiments are ideally made in a process in which algae are grown which consume $CO_2$ and convert it into other substances of economic interest.

The applicant, upon filing this patent application with the competent body ensures, seeks and intends: (i) to name the inventors in respect of their respective moral rights; (ii) indicate unequivocally that it is the owner of the industrial secret and owner of any form of intellectual property deriving from it and the applicant wishes; (iii) to describe in detail the content object of the secret, proving its existence in the physical and legal planes; (iv) to establish the relationship between the examples/embodiments and the inventive concept according to the applicant's cognition and its context, in order to clearly demonstrate the scope of its intangible, protected and/or tutelage good; (v) request and obtain the additional rights provided for patents if the applicant chooses to continue with the administrative procedure until the end.

The possible future publication of the patent application does not in itself constitute authorization for commercial use by third parties. Even if the content becomes part of the physical world accessible to third parties, publication of the patent application under the terms of the law does not eliminate the legal status of secrecy, serving only and only the spirit of the Law to: (i) unequivocally indicate its possessor owner and inventor(s); (ii) to inform third parties as to the existence of said industrial secret, the content for which patent protection is required and the date of filing, from which the patent exclusivity term shall begin; and (iii) assist in the technological and economic development of the Country, from the authorization of the use of the unique secret and exceptionally for purposes of studies and/or development of new improvements, thereby avoiding parallel reinvestment by third parties in the development of the same good.

From the outset, it is advised that any commercial use requires the authorization of the owner/holder and that unauthorized use leads to penalties provided for by Law. In this context, given the extensive detail according to which the concept and examples were revealed by the applicant, those skilled in the art may, without much effort, consider other ways of embodying the present invention in ways not identical with those merely exemplified above. However, such forms are or may be considered to be within the scope of one or more of the appended claims.

The invention claimed is:

1. Equipment for massive dilution of gases in liquids, comprising:
   a rigid body having a top, a bottom, an interior, a zone of greater cross-sectional area in a lower region, and a zone of smaller cross-sectional area in an upper region, said rigid body comprising at least one liquid inlet region in the lower region, at least one liquid outlet region at the top and/or the bottom, and at least one gas outlet region in the upper region, said rigid body containing, in its interior:
      at least one conventional gas bubble forming device in the lower region; and
      at least one liquid thin film forming hive, said at least one hive having a plurality of inner channels with a smaller cross-sectional area relative to a zone of smaller cross-sectional area in the upper region, the liquid in which the gas is dissolved being extravagated after passing through said at least one hive;
   wherein said rigid body further comprises:
      at least one set of external pipes connected to the liquid inlet region or the liquid outlet region; and
      a separation wall vertically dividing the rigid body at least partially into two regions, thereby enabling active reversing of the flow direction of the liquid passing through the interior of the rigid body and by the at least one set of external pipes.

2. The equipment according to claim 1, wherein the active reversing of the flow direction of the liquid passing through the interior of the rigid body and by the at least one set of external pipes is carried out by means selected from the group consisting of: rotation of a perforated tube to one or another internal area of the equipment of the invention; use of a location changing physical barrier to divert the flow of gases to one or another internal area of the equipment of the invention; use of a perforated tube in each internal area of the equipment, selectively actuating one or other or both areas by means of valves; and combinations thereof.

3. The equipment according to claim 1, further comprising flotation means and/or at least one gas and/or liquid pumps.

4. The equipment according to claim 2, further comprising flotation means and/or at least one gas and/or liquid pumps.

* * * * *